United States Patent
Holmgren et al.

(10) Patent No.: US 9,658,702 B2
(45) Date of Patent: May 23, 2017

(54) SYSTEM AND METHOD OF OBJECT RECOGNITION FOR AN INTERACTIVE INPUT SYSTEM

(71) Applicant: SMART Technologies ULC, Calgary (CA)

(72) Inventors: David E Holmgren, Calgary (CA); Daniel McReynolds, Calgary (CA)

(73) Assignee: SMART Technologies ULC, Calgary (CA)

(*) Notice: Subject to any disclaimer, the term of this patent is extended or adjusted under 35 U.S.C. 154(b) by 19 days.

(21) Appl. No.: 14/824,884

(22) Filed: Aug. 12, 2015

(65) Prior Publication Data
US 2017/0045957 A1    Feb. 16, 2017

(51) Int. Cl.
| | | |
|---|---|---|
| G06F 3/0354 | (2013.01) | |
| G06F 3/041 | (2006.01) | |
| G06T 7/20 | (2017.01) | |
| H04N 5/247 | (2006.01) | |

(52) U.S. Cl.
CPC ............ *G06F 3/0354* (2013.01); *G06F 3/041* (2013.01); *G06T 7/20* (2013.01); *H04N 5/247* (2013.01)

(58) Field of Classification Search
CPC ......... G06F 3/0354; G06F 3/041; G06T 7/20; G06T 7/2086; H04N 5/247; H04N 5/23238; G09G 5/008; G09G 3/3611
USPC ........................................................ 345/157
See application file for complete search history.

(56) References Cited

U.S. PATENT DOCUMENTS

| | | |
|---|---|---|
| 6,954,197 B2 | 10/2005 | Morrison et al. |
| 7,532,206 B2 | 5/2009 | Morrison et al. |
| 7,619,617 B2 | 11/2009 | Morrison et al. |
| 8,228,304 B2 | 7/2012 | Morrison et al. |
| 8,537,134 B2 | 9/2013 | Morrison et al. |
| 8,600,107 B2 | 12/2013 | Holmgren |
| 8,624,835 B2 | 1/2014 | Akitt |
| 8,872,772 B2 | 10/2014 | Thompson et al. |
| 8,902,193 B2 | 12/2014 | Hansen et al. |
| 2006/0093317 A1* | 5/2006 | Law ................. G09G 5/008 386/343 |
| 2009/0109290 A1* | 4/2009 | Ye ..................... G09G 3/3611 348/155 |
| 2009/0278794 A1 | 11/2009 | McReynolds et al. |
| 2011/0242339 A1* | 10/2011 | Ogawa ............... G06T 7/2086 348/208.4 |
| 2016/0028950 A1* | 1/2016 | Perazzi ............. H04N 5/23238 348/38 |
| 2016/0338120 A1 | 11/2016 | Boyle |

OTHER PUBLICATIONS

Morbey, C.L., "A Synthesis of the Solutions of Spectroscopic and Visual Binary Orbits", Publications of the Astronomical Society of the Pacific. 87:689-693, Oct. 1975.

* cited by examiner

*Primary Examiner* — Fred Tzeng
(74) *Attorney, Agent, or Firm* — Ridout & Maybee LLP

(57) ABSTRACT

The present invention relates to a method and system of improved pointer recognition. A camera-based interactive system has two cameras with fields of view observing an interactive surface. A processor receives a plurality of video frames from the cameras and recognizes a pointer within the video frames. Motion blur of the pointer is compensated to determine the pointer type from the compensated frames using a model-based approach.

21 Claims, 15 Drawing Sheets

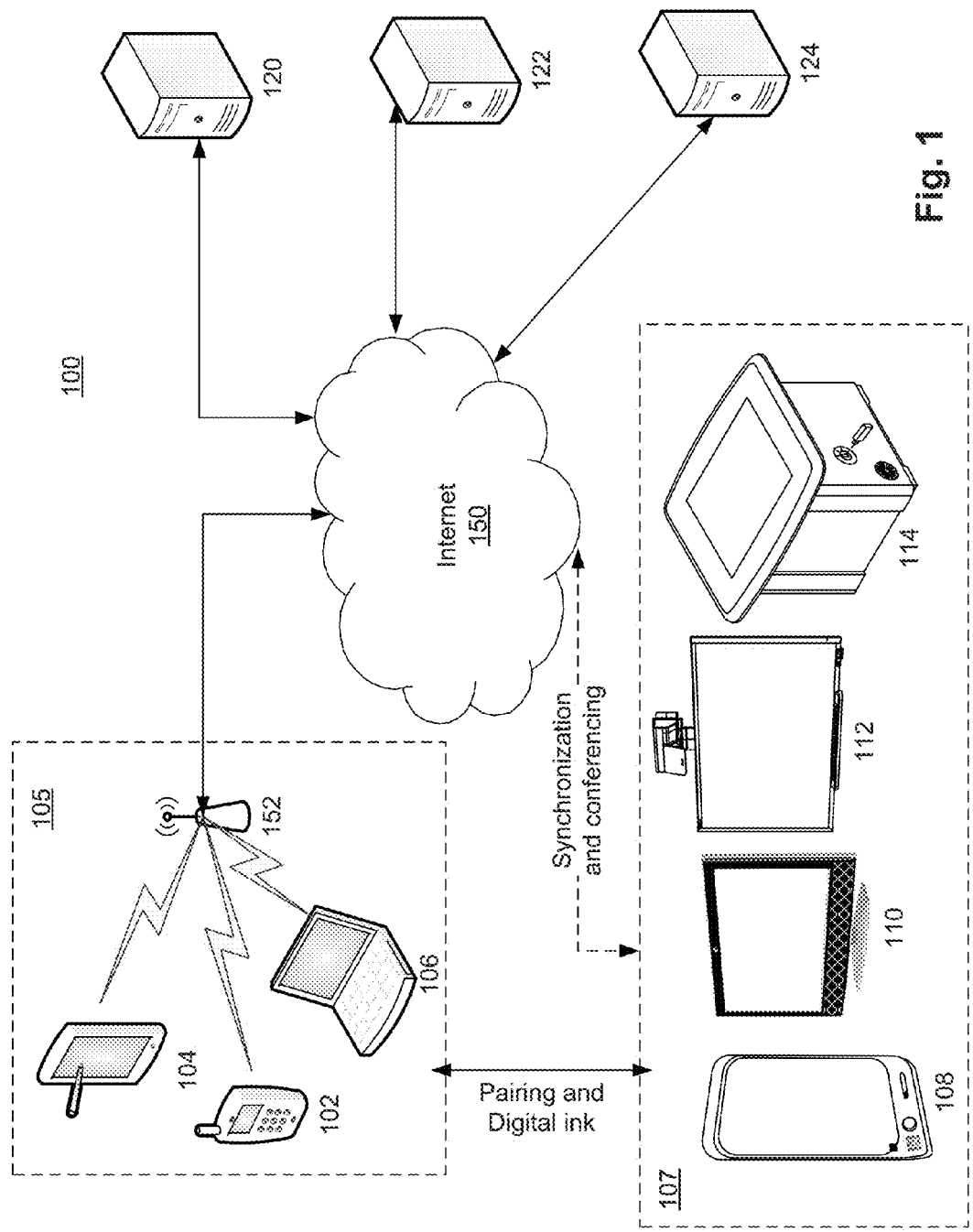

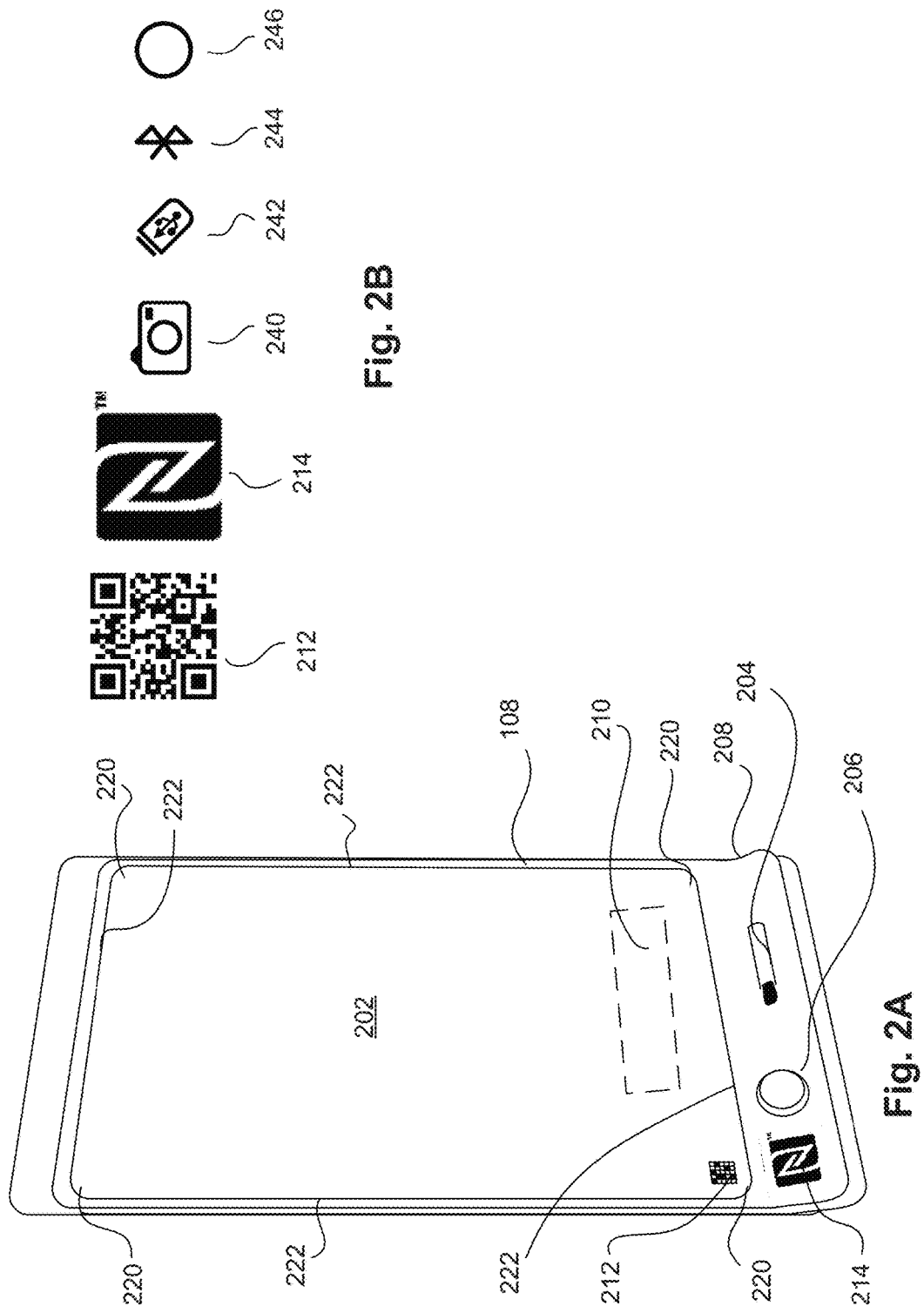

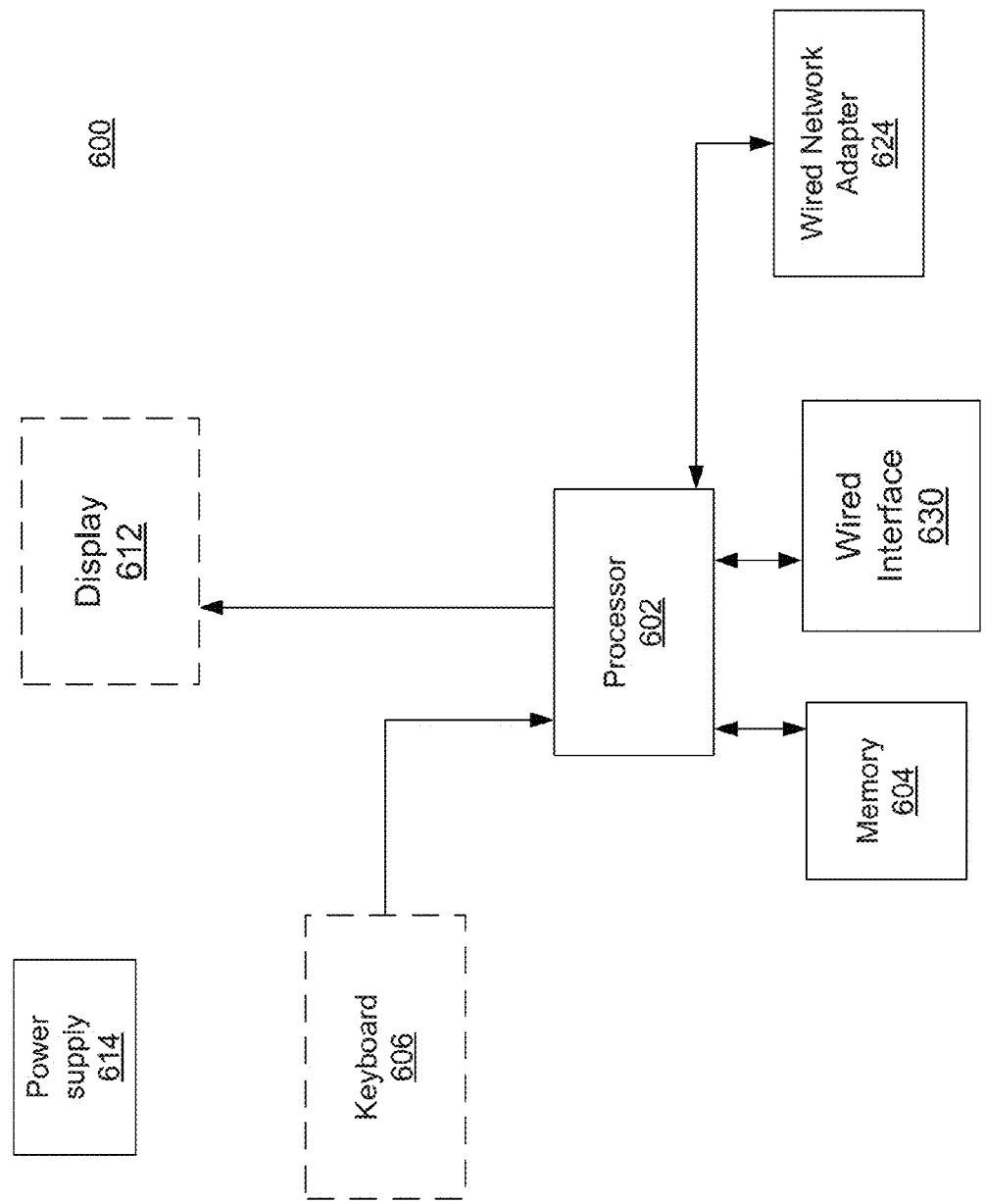

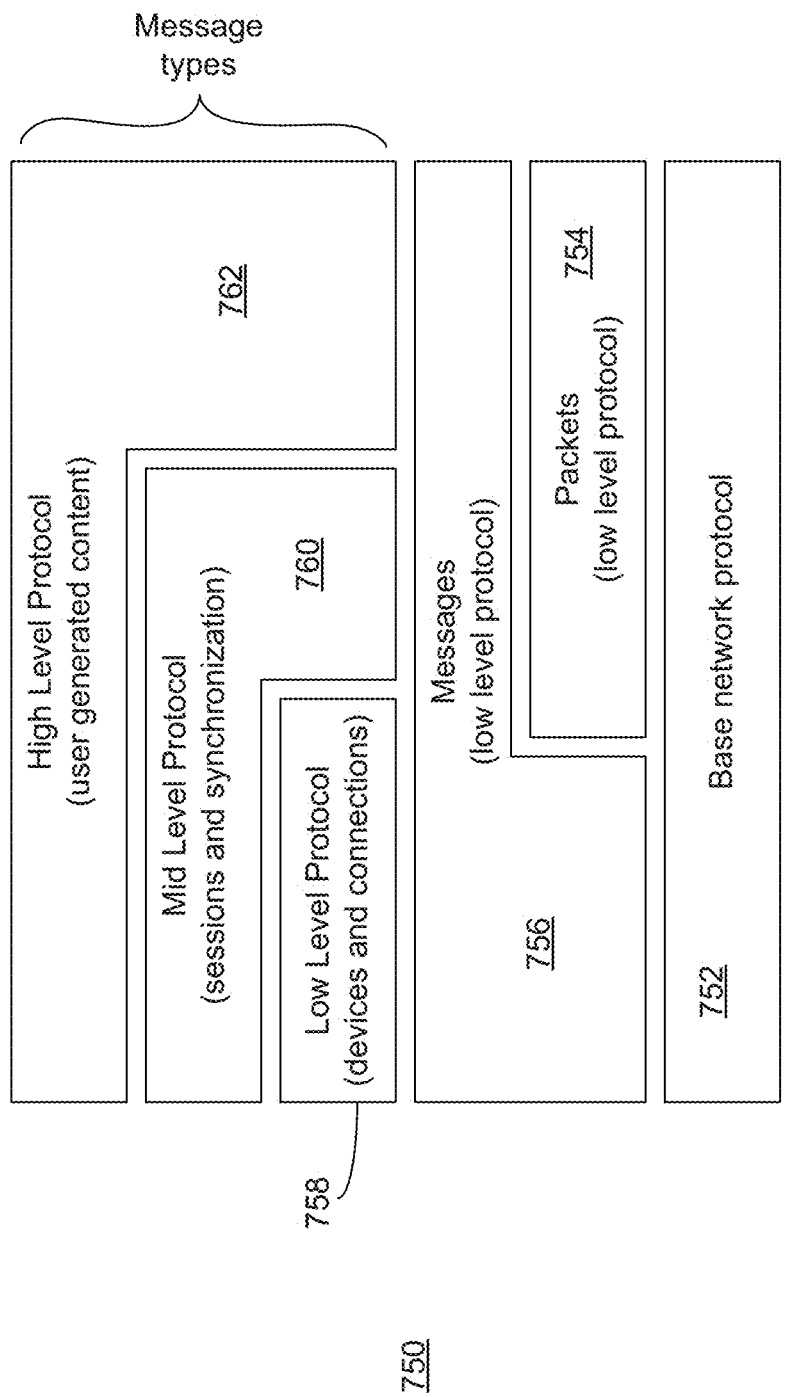

SYSTEM AND METHOD OF OBJECT RECOGNITION FOR AN INTERACTIVE INPUT SYSTEM

FIELD OF THE INVENTION

The present invention relates generally to object recognition for an interactive input system. More particularly, the present invention relates to a method and system of improved pointer recognition.

BACKGROUND OF THE INVENTION

Pointer identification has a number of advantages in a touch system such as being able to attribute different colours to each particular pointer. In more advanced systems, the pointer may be attributed to a particular user. Prior methods of determining a pointer type have been disclosed in U.S. Pat. Nos. 6,954,197; 7,532,206; 7,619,617; 8,228,304; 8,537,134; and 8,872,772 as well as U.S. Publication No. 2009/0278794; all to SMART Technologies, ULC assignee of the present invention, all of which are herein incorporated by reference in their entirety.

U.S. Pat. No. 6,954,197 describes a camera-based touch system wherein two cameras acquire images of the touch surface from different locations and having overlapping fields of view. A digital signal processor is associated with each camera. The digital signal processors process pixel data to generate pointer characteristic data to identify the edges of the pointer. A master processor triangulates the edge information in the pointer characteristic data to determine a bounding area that represents a pointer perimeter.

U.S. Pat. No. 7,532,206 describes a camera-based touch system comprises a touch surface and at least one imaging device acquiring images of the touch surface. At least one processor analyzes images acquired by the one imaging device to determine the type of pointer used to contact said touch surface and the touch location on touch surface. The pointer type is determined by at least one three-dimensional formation adjacent the end of the pointer.

U.S. Pat. No. 8,872,772 describes a machine vision interactive input system detecting a pointer placed within the field of view of an imaging assembly. The pointer having at least one retro-reflective band placed thereon. The pointer type is identified by the at least one retro-reflective band within the images.

U.S. Publication No. 2009/0278794 describes an interactive input system having one or more imaging devices capturing images of a region of interest. A plurality of radiation sources such as located on each pointer are modulated whereby the processed images permit identification of the pointer based on the modulated radiation.

Prior methods have relied on sophisticated image sensors, additional hardware components, and/or limited touch area size. Although these prior methods work well, there is a need for a less expensive but reliable alternative for pointer identification on large format touch screens. Prior methods have compensated for inexpensive image sensors by adding extra cameras, making the pointer active (e.g. emitting LED light), increasing the focal length of the camera's lens, etc. These systems tend to have more complexity than may be necessary.

The invention described herein at least provides improved pointer recognition on large format touch screens utilizing image sensors with limited touch screen area size.

SUMMARY OF THE INVENTION

According to one aspect of the invention, there is provided an interactive system having a processing structure and an interactive surface with one or more cameras having fields of view observing the interactive surface. A computer-readable medium having instructions to configure the processing structure to: receive a plurality of video frames from the cameras; recognize a pointer within a portion of the video frames; compensate for motion blur of the pointer; process the compensated frames to generate a mean intensity profile; and determine a pointer type from the compensated frames. The processing structure may also be configured to divide each of the portion of video frames by a background image to recognize the pointer where the background image may be generated from a number of images without the pointer being present. The motion blur compensation may occur over a window of frames. The processing structure may measure a width parameter of the pointer to determine the pointer type wherein the width parameter may be a point-spread function (PSF) width and a real pointer width. The processing structure may disentangle the point-spread function width and the real pointer width. The processing structure may determine best fit parameters for an erf model defined by $$F = \frac{A}{2} \cdot \left( \mathrm{erf}\left( \frac{x - x_0 + w}{\sqrt{2} \cdot \sigma} \right) - \mathrm{erf}\left( \frac{x - x_0 - w}{\sqrt{2} \cdot \sigma} \right) \right) + ZPT$$

where $x_0$ is the computed position of the VIP peak in the image, A is an arbitrary amplitude, $\sigma$ is a PSF width, and ZPT is a zero-level offset, and w is the half-width parameter of the pointer. The processing structure may determine the best fit parameters by a nonlinear least-squares method. The PSF width may be fixed to about 0.7 pixels. The processing structure may further determine an equivalent width of the pointer by integrating the erf model.

In yet another aspect of the invention, the processing structure may determine best fit parameters for a Butterworth model defined by $$F = A \cdot \frac{1}{1 + \left(\frac{x - x_0}{w}\right)^6} + ZPT$$

where $x_0$ is the computed position of the VIP peak in the image, A is an arbitrary amplitude and ZPT is a zero-level offset, and w is the half-width parameter of the pointer. The processing structure may determine the best fit parameters by a nonlinear least-squares method such as a wide-band ambiguity function (WAF). The processing structure may determine an equivalent width of the pointer by integrating the Butterworth model.

The processing structure may estimate a peak location for each of the video frames and calculate a standard deviation. The processing structure may shift a peak location for each of the video frames. The processing structure may assign a pointer identifier to the pointer. The processing structure may associate at least one digital ink attribute to the pointer identifier.

According to another aspect of the invention, the interactive device may further comprise an infrared pass filter covering the field of view of the cameras where the infrared range may be between about 830 nm to about 880 nm. The interactive device may have at least one infrared light emitting diode (LED) associated with each camera where the LEDs emit light at about 850 nm. The interactive device may further comprise retro-reflective bezels within the field of view of the cameras.

According to any aspect of the invention, the interactive device may be at least one of a capture board, an interactive whiteboard, an interactive flat screen display, or an interactive table.

According to another aspect of the invention, there is provided a computer-implemented method comprising: receiving, by a processing structure, a plurality of video frames from a plurality of cameras; recognizing, by the processing structure, a pointer within a portion of the video frames; compensating, by the processing structure, for motion blur of the pointer; processing, by the processing structure, the compensated frames to generate a mean intensity profile; and determining, by the processor, a pointer type from the compensated frames. The compensation for motion blur occurs over a window of frames. The computer-implemented method may further comprise dividing each of the portion of video frames by a background image to recognize the pointer. The computer implemented method may further comprise generating the background image from a number of images without the pointer being present. The computer-implemented method may comprise measuring, by the processing structure, a width parameter of the pointer to determine the pointer type. The width parameter may comprise a point-spread function (PSF) width and a real pointer width. The computer-implemented method may further comprise disentangling, by the processing structure, the point-spread function width and the real pointer width.

According to another aspect of the invention, the computer-implemented method may further comprise determining, by the processing structure, best fit parameters for an erf model defined by $$F = \frac{A}{2} \cdot \left( \mathrm{erf}\left( \frac{x - x_0 + w}{\sqrt{2} \cdot \sigma} \right) - \mathrm{erf}\left( \frac{x - x_0 - w}{\sqrt{2} \cdot \sigma} \right) \right) + ZPT$$

where $x_0$ is the computed position of the VIP peak in the image, A is an arbitrary amplitude, $\sigma$ is a PSF width wherein the PSF width may be fixed to about 0.7 pixels, and ZPT is a zero-level offset, and w is the half-width parameter of the pointer. The computer-implemented method may further comprise determining the best fit parameters involves a nonlinear least-squares method. The computer-implemented method may further comprise determining, by the processing structure, an equivalent width of the pointer by integrating the erf model.

According to another aspect of the invention, the computer-implemented method may further comprise determining, by the processing structure, best fit parameters for a Butterworth model defined by $$F = A \cdot \frac{1}{1 + \left( \frac{x - x_0}{w} \right)^6} + ZPT$$

where $x_0$ is the computed position of the VIP peak in the image, A is an arbitrary amplitude and ZPT is a zero-level offset, and w is the half-width parameter of the pointer. The computer-implemented method may further comprise determining the best fit parameters involving a nonlinear least-squares method where the nonlinear least-squared method may comprise a wide-band ambiguity function (WAF). The computer-implemented method may determine, by the processing structure, an equivalent width of the pointer by integrating the Butterworth model. The computer-implemented method may further comprise estimating, by the processing structure, a peak location for each of the video frames and calculate a standard deviation and may further comprise shifting a peak location for each of the video frames.

According to another aspect of the invention, the computer-implemented method may further comprise assigning a pointer identifier to the pointer and may further comprise associating at least one digital ink attribute to the pointer identifier.

BRIEF DESCRIPTION OF THE DRAWINGS

An embodiment will now be described, by way of example only, with reference to the attached Figures, wherein:

FIG. 1 shows an overview of collaborative devices in communication with one or more portable devices and servers;

FIGS. 2A and 2B show a perspective view of a capture board and control icons respectively;

FIG. 6 shows a processing structure of one of more servers;

FIGS. 7A and 7B demonstrate an overview of processing structure and protocol stack of a communication system;

DETAILED DESCRIPTION OF THE EMBODIMENT

Figure 2C:
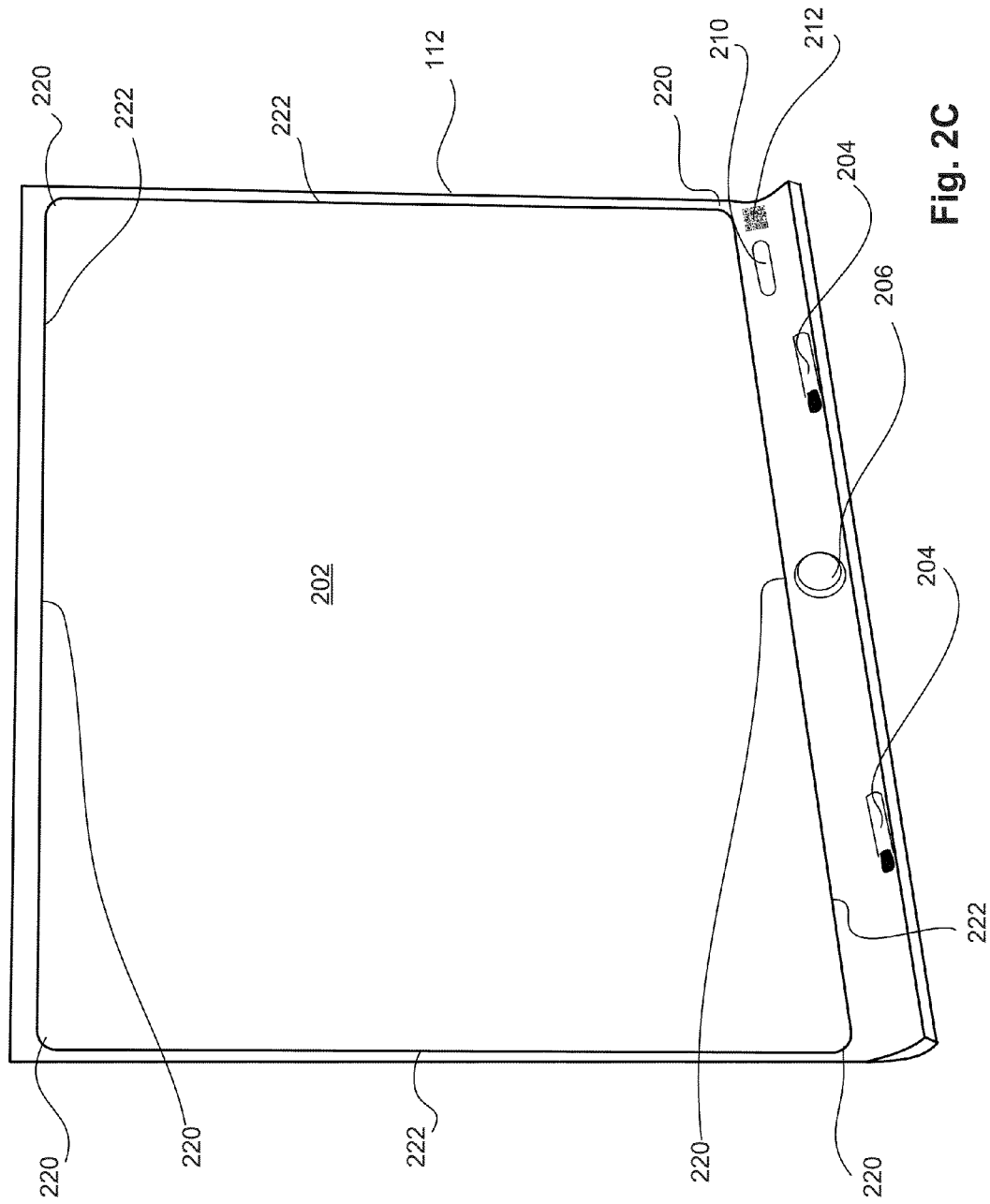
FIG. 2C shows a perspective view of an interactive whiteboard in a landscape configuration.

While the Background of Invention described above has identified particular problems known in the art, the present invention provides, in part, a new and useful application adapting communication between interactive systems.

FIG. 1 demonstrates a high-level hardware architecture 100 of the present embodiment. A user has a mobile device 105 such as a smartphone 102, a tablet computer 104, or laptop 106 that is in communication with a wireless access point 152 such as 3G, LTE, WiFi, Bluetooth®, near-field communication (NFC) or other proprietary or non-proprietary wireless communication channels known in the art. The wireless access point 152 allows the mobile devices 105 to communicate with other computing devices over the Internet 150. In addition to the mobile devices 105, a plurality of collaborative devices 107 such as a Kapp™ interactive whiteboard 112 produced by SMART Technologies, wherein the User's Guide is herein incorporated by reference, an interactive flat screen display 110, an interactive whiteboard 112, or an interactive table 114 may also connected to the Internet 150. The system comprises an authentication server 120, a profile or session server 122, and a content server 124. The authentication server 120 verifies a user login and password or other type of login such as using encryption keys, one time passwords, etc. The profile server 122 saves information about the user logged into the system. The content server 124 comprises three levels: a persistent back-end database, middleware for logic and synchronization, and a web application server. The mobile devices 105 may be paired with the interactive whiteboard 112 as will be described in more detail below. The interactive whiteboard 112 may also provide synchronization and conferencing capabilities over the Internet 150 as will also be further described below.

As shown in FIGS. 2A and 2C, the capture board 108 and interactive whiteboard 112 comprises a generally rectangular touch area or interactive surface 202 whereupon a user may draw using a dry erase marker or pointer 204 and erase using an eraser 206. The interactive whiteboard 112 may have a diagonal length of approximately 2 meters. The interactive whiteboard 112 may be in a portrait or landscape configuration and may be a variety of aspect ratios. The interactive whiteboard 112 may be mounted to a vertical support surface such as for example, a wall surface or the like or optionally mounted to a moveable or stationary stand. Optionally, the touch area 202 may also have a display 318 for presenting information digitally and the marker 204 and eraser 206 produces virtual ink on the display 318. The touch area 202 comprises a touch sensing technology capable of determining and recording the pointer 204 (or eraser 206) position within the touch area 202. The recording of the path of the pointer 204 (or eraser) permits the capture board to have a digital representation of all annotations stored in memory as described in more detail below.

The interactive whiteboard 112 comprises at least one of a quick response (QR) code 212 and/or a near-field communication (NFC) area 214 of which may be used to pair the mobile device 105 to the interactive whiteboard 112. The QR code 212 is a two-dimensional bar code that may be uniquely associated with the interactive whiteboard 112. In this embodiment, the QR Code 212 comprises a pairing Universal Resource Locator (URL) derived from the Bluetooth address of the board as described in U.S. Publication Ser. No. 14/712,452, herein incorporated by reference. The NFC area 214 comprises a loop antenna (not shown) that interfaces by electromagnetic induction to a second loop antenna 340 located within the mobile device 105. Near-field communication operates within the globally available and unlicensed radio frequency ISM band of 13.56 MHz on ISO/IEC 18000-3 air interface and at rates ranging from 106 kbit/s to 424 kbit/s. Similar as for the QR code 212, the NFC tag 214 stores the pairing URL produced in a similar manner as for the QR code 212.

As shown in FIG. 2B, an elongate icon control bar 210 may be present adjacent the bottom of the touch area 202 or on the tool tray 208 and this icon control bar may also incorporate the QR code 212 and/or the NFC area 214. All or a portion of the control icons within the icon control bar 210 may be selectively illuminated (in one or more colours) or otherwise highlighted when activated by user interaction or system state. Alternatively, all or a portion of the icons may be completely hidden from view until placed in an active state. The icon control bar 210 may comprise a capture icon 240, a universal serial bus (USB) device connection icon 242, a Bluetooth/WiFi icon 244, and a system status icon 246 as will be further described below. Alternatively, if the interactive whiteboard 112 has a display 318, then the icon control bar 210 may be digitally displayed on the display 318 and may optionally overlay the other displayed content on the display 318.

In this example, the capture board 108 and/or interactive whiteboard 112 comprise at least two cameras or image sensors, in this case E65 cameras (e.g. f=281.25 pixels, which with a 7.92 μm pixel size gives a 2.2 mm focal length), in each of the corners 220. The interactive whiteboard 112 may also comprise image sensors 220 in the center of one or more sides of the board 112. In this case, the E65 cameras 220 record three infrared colour video data. The cameras 220 have fields of view looking into the touch area 202 in order to locate pointer(s) 204 within the touch area 202. The field of view of the cameras 220 encompass at least a portion of retroreflective segments 222 located around the periphery of the touch area 202. In this example, the segments 222 are 1 cm in width and are the length of the corresponding side of the touch area 202. Light emitting diodes (not shown) located at each of the cameras 220 emit light across the touch area 202 to reflect off the retroreflective segments 222 which return the light to the respective camera 220. When a pointer 204 enters the touch area 202, the reflected light is blocked permitting the camera 220 to locate the pointer 204 within one or more images. Within each image, a vertical intensity profile (VIP) is generated by differencing or dividing the image with the background image and for the difference image, summing each pixel column as described in U.S. Pat. No. 8,600,107, herein incorporated by reference in its entirety. Multiple VIPs from different cameras 220 may be used to triangulate the position of the pointer 204 on the touch area 202. Variations and more details of the operation of this type of system are further described in U.S. Pat. Nos. 8,624,835 and 8,902,193 to SMART Technologies ULC, herein incorporated by reference in their entirety.

Figure 3A:
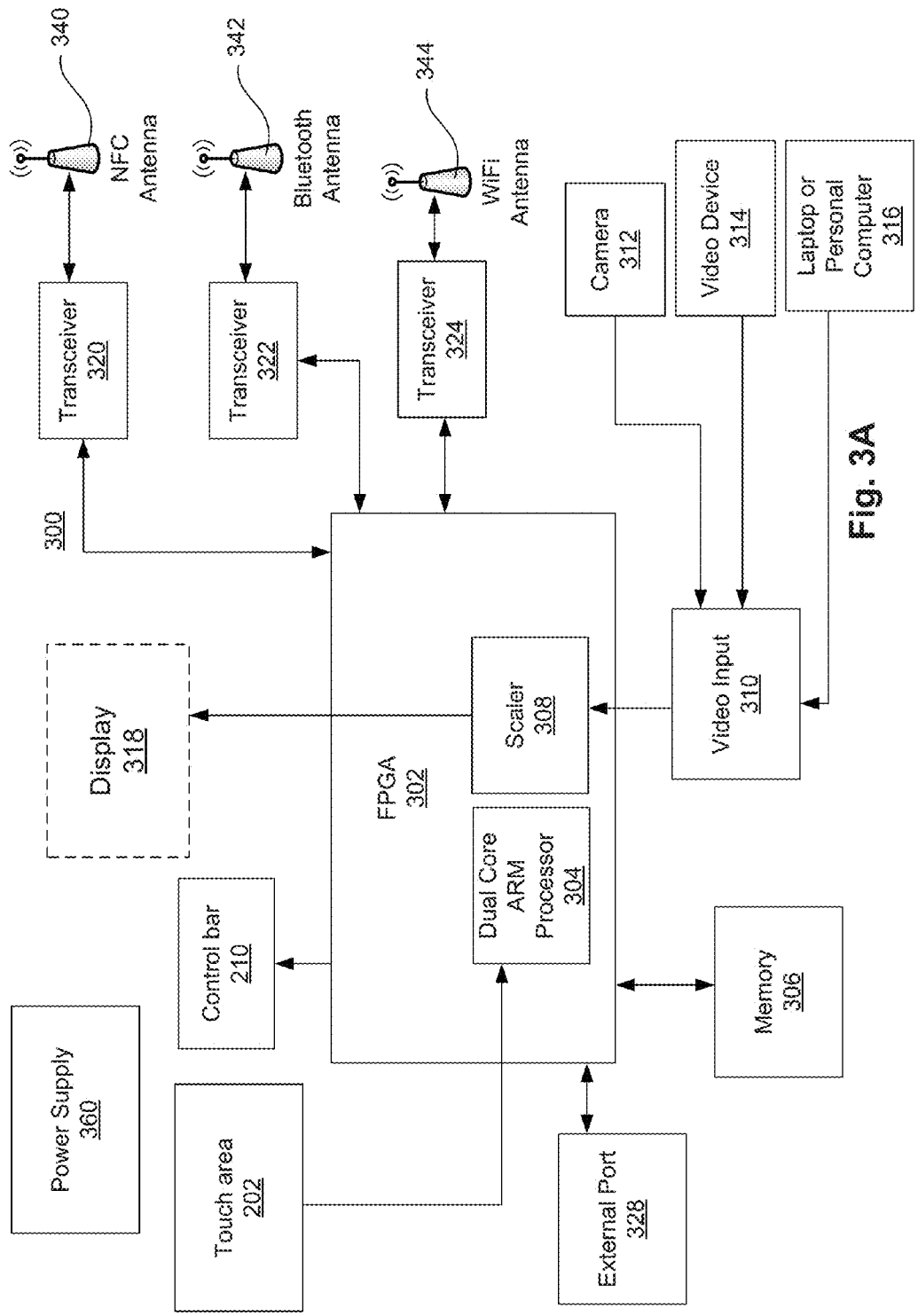
FIGS. 3A to 3C demonstrate a processing architecture of the capture board.
Figure 3B:
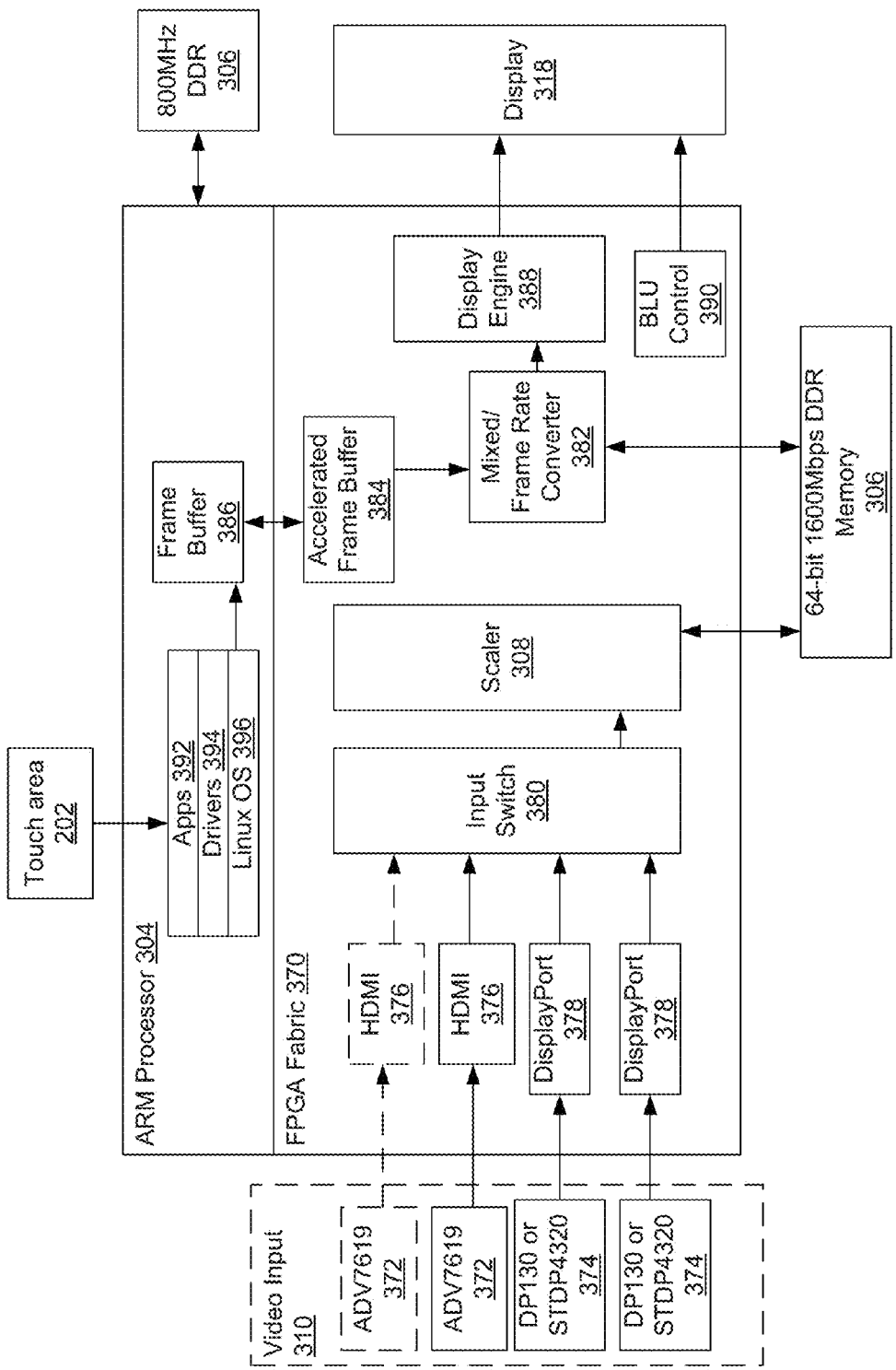
Figure 3C:
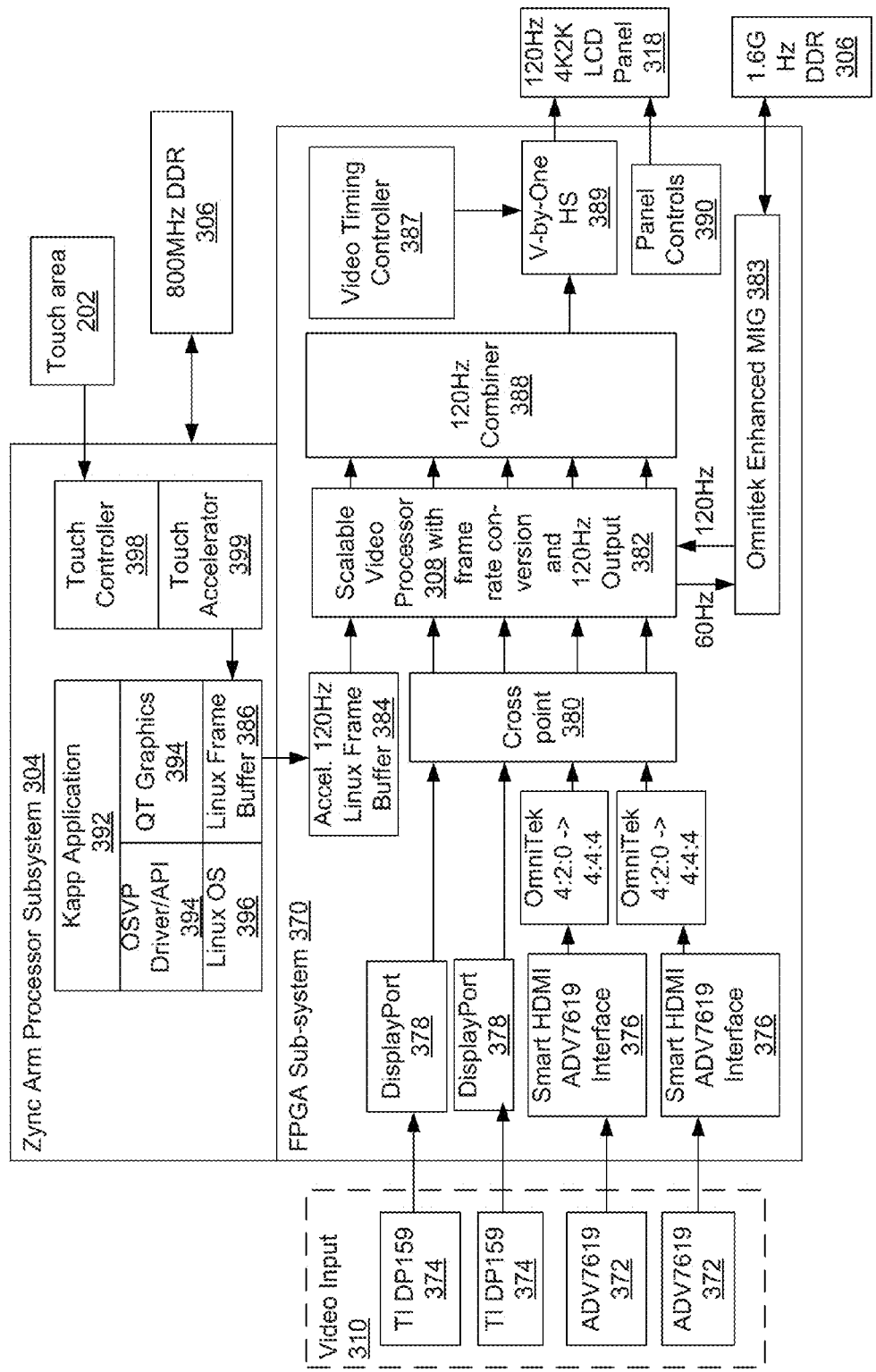

Turning to FIGS. 3A to 3C, the interactive whiteboard 112 may be controlled with an field programmable gate array (FPGA) 302 or other processing structure which in this embodiment, comprises a dual core ARM Processor 304 executing instructions from volatile or non-volatile memory 306 and storing data thereto. The FPGA 302 may also comprises a scaler 308 which scales video inputs 310 to a format suitable for presenting on a display 318. The display 318 generally corresponds in approximate size and approximate shape to the touch area 202. The display 318 is typically a large-sized display for either presentation or collaboration with group of users. The resolution is sufficiently high to ensure readability of the display 318 by all participants. The video input 310 may be from a camera 312, a video device 314 such as a DVD player, Blu Ray player, VCR, etc, or a laptop or personal computer 316. The FPGA 302 communicates with the mobile device 105 (or other devices) using one or more transceivers such as, in this embodiment, an NFC transceiver 320 and antenna 340, a Bluetooth transceiver 322 and antenna 342, or a WiFi transceiver 324 and antenna 344. Optionally, the transceivers and antennas may be incorporated into a single transceiver and antenna. The FPGA 302 may also communicate with an external device 328 such as a USB memory storage device (not shown) where data may be stored thereto. A wired power supply 360 provides power to all the electronic components 300 of the interactive whiteboard 112. The FPGA 302 interfaces with the previously mentioned icon control bar 210.

When the user contacts the pointer 204 with the touch area 202, the processor 304 tracks the motion of the pointer 204 and stores the pointer contacts in memory 306. Alternatively, the touch points may be stored as motion vectors or Bezier splines. The memory 306 therefore contains a digital representation of the drawn content within the touch area 202. Likewise, when the user contact the eraser 206 with the touch area 202, the processor 304 tracks the motion of the eraser 206 and removes drawn content from the digital representation of the drawn content. In this embodiment, the digital representation of the drawn content is stored in non-volatile memory 306.

When the pointer 204 contacts the touch area 202 in the location of the capture (or snapshot) icon 240, the FPGA 302 detects this contact as a control function which initiates the processor 304 to copy the currently stored digital representation of the drawn content to another location in memory 306 as a new page also known as a snapshot. The capture icon 240 may optionally flash during the saving of the digital representation of drawn content to another memory location. The FPGA 302 then initiates a snapshot message to one or more of the paired mobile device(s) 105 via the appropriately paired transceiver(s) 320, 322, and/or 324. The message contains an indication to the paired mobile device(s) 105 to capture the current image as a new page. Optionally, the message may also contain any changes that were made to the page after the last update sent to the mobile device(s) 105. The user may then continue to annotate or add content objects within the touch area 202. Optionally, once the transfer of the page to the paired mobile device 105 is complete, the page may be deleted from memory 306.

If a USB memory device (not shown) is connected to the external port 328, the FPGA 302 illuminates the USB device connection icon 242 in order to indicate to the user that the USB memory device is available to save the captured pages. When the user contacts the capture icon 240 with the pointer 204 and the USB memory device is present, the captured pages are transferred to the USB memory device as well as being transferred to any paired mobile device 105. The captured pages may be converted into another file format such as PDF, Evernote, XML, Microsoft Word®, Microsoft® Visio, Microsoft® Powerpoint, etc and if the file has previously been saved on the USB memory device, then the pages since the last save may be appended to the previously saved file. During a save to the USB memory, the USB device connection icon 242 may flash to indicate a save is in progress.

If the user contacts the USB device connection icon 242 using the pointer 204 and the USB memory device is present, the FPGA 302 flushes any data caches to the USB memory device and disconnects the USB memory device in the conventional manner. If an error is encountered with the USB memory device, the FPGA 302 may cause the USB device connection icon 242 to flash red. Possible errors may be the USB memory device being formatted in an incompatible format, communication error, or other type of hardware failure.

When one or more mobile devices 105 begins pairing with the interactive whiteboard 112, the FPGA 302 causes the Bluetooth icon 244 to flash. Following connection, the FPGA 302 causes the Bluetooth icon 244 to remain active. When the pointer 204 contacts the Bluetooth icon 244, the FPGA 302 may disconnect all the paired mobile devices 105 or may disconnect the last connected mobile device 105. Optionally for capture boards 108 with a display 318, the FPGA 302 may display an onscreen menu on the display 318 prompting the user to select which mobile device 105 (or remotely connected device) to disconnect. When the mobile device 105 is disconnecting from the interactive whiteboard 112, the Bluetooth icon 244 may flash red in colour. If all mobile devices 105 are disconnected, the Bluetooth icon 244 may be solid red or may not be illuminated.

When the FPGA 302 is powered and the interactive whiteboard 112 is working properly, the FPGA 302 causes the system status icon 246 to become illuminated. If the FPGA 302 determines that one of the subsystems of the interactive whiteboard 112 is not operational or is reporting an error, the FPGA 302 causes the system status icon 246 to flash. When the interactive whiteboard 112 is not receiving power, all of the icons in the control bar 210 are not illuminated.

FIGS. 3B and 3C demonstrate examples of structures and interfaces of the FPGA 302. As previously mentioned, the FPGA 302 has an ARM Processor 304 embedded within it. The FPGA 302 also implements an FPGA Fabric or Sub-System 370 which, in this embodiment comprises mainly video scaling and processing. The video input 310 comprises receiving either High-Definition Multimedia Interface (HDMI) or DisplayPort, developed by the Video Electronics Standards Association (VESA), via one or more Xpressview 3 GHz HDMI receivers (ADV7619) 372 produced by Analog Devices, the Data Sheet and User Guide herein incorporated by reference, or one or more DisplayPort Re-driver (DP130 or DP159) 374 produced by Texas Instruments, the Data Sheet, Application Notes, User Guides, and Selection and Solution Guides herein incorporated by reference. These HDMI receivers 372 and DisplayPort re-drivers 374 interface with the FPGA 302 using corresponding circuitry implementing Smart HDMI Interfaces 376 and DisplayPort Interfaces 378 respectively. An input switch 380 detects and automatically selects the currently active video input. The input switch or crosspoint 380 passes the video signal to the scaler 308 which resizes the video to appropriately match the resolution of the currently connected display 318. Once the video is scaled, it is stored in memory 306 where it is retrieved by the mixed/frame rate converter 382.

The ARM Processor 304 has applications or services 392 executing thereon which interface with drivers 394 and the Linux Operating System 396. The Linux Operating System 396, drivers 394, and services 392 may initialize wireless stack libraries. For example, the protocols of the Bluetooth Standard, the Adopted Bluetooth Core Specification v 4.2 Master Table of Contents & Compliance Requirements herein incorporated by reference, may be initiated such as an radio frequency communication (RFCOMM) server, configure Service Discovery Protocol (SDP) records, configure a Generic Attribute Profile (GATT) server, manage network connections, reorder packets, transmit acknowledgements, in addition to the other functions described herein. The applications 392 alter the frame buffer 386 based on annotations entered by the user within the touch area 202.

A mixed/frame rate converter 382 overlays content generated by the Frame Buffer 386 and Accelerated Frame Buffer 384. The Frame Buffer 386 receives annotations and/or content objects from the touch controller 398. The Frame Buffer 386 transfers the annotation (or content object) data to be combined with the existing data in the Accelerated Frame Buffer 384. The converted video is then passed from the frame rate converter 382 to the display engine 388 which adjusts the pixels of the display 318.

In FIG. 3C, a OmniTek Scalable Video Processing Suite, produced by OmniTek of the United Kingdom, the OSVP 2.0 Suite User Guide June 2014 herein incorporated by reference, is implemented. The scaler 308 and frame rate converter 382 are combined into a single processing block where each of the video inputs are processed independently and then combined using a 120 Hz Combiner 388. The scaler

308 may perform at least one of the following on the video: chroma upsampling, colour correction, deinterlacing, noise reduction, cropping, resizing, and/or any combination thereof. The scaled and combined video signal is then transmitted to the display 318 using a V-by-One HS interface 389 which is an electrical digital signaling standard that can run at up to 3.75 Gbit/s for each pair of conductors using a video timing controller 387. An additional feature of the embodiment shown in FIG. 3C is an enhanced Memory Interface Generator (MIG) 383 which optimizes memory bandwidth with the FPGA 302. The cameras 220 located around the periphery of the touch area 202 provide images to the touch controller 398. The touch controller 398 then processes the images as described in further detail below. The touch accelerator 399 determines which pointer 204 is annotating or adding content objects and injects the annotations or content objects directly into the Linux Frame buffer 386 using the appropriate ink attributes. The FPGA 302 may also contain backlight control unit (BLU) or panel control circuitry 390 which controls various aspects of the display 318 such as backlight, power switch, on-screen displays, etc.

Figure 4:
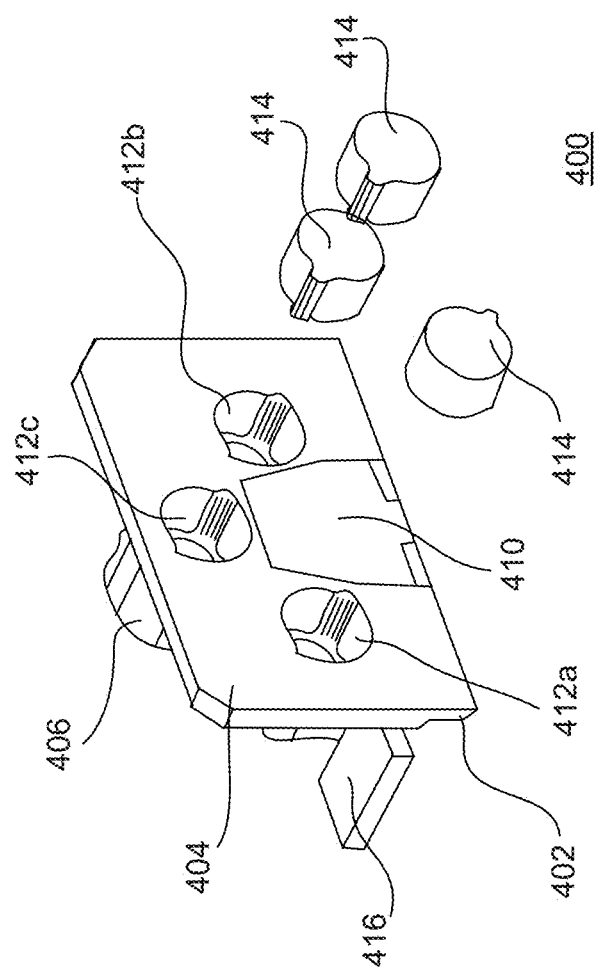
FIG. 4 shows an example camera of a touch detection system of the capture board.

The camera 220 and its associated lens (not shown) as well as its infrared light emitting diodes, or IR LEDs, (not shown) are mounted on a camera housing assembly 400 that is illustrated in FIG. 4. As can be seen, the housing assembly 400 comprises a polycarbonate housing body 402 having a front portion 404 and a rear portion 406 extending from the front portion 404. An imaging aperture is centrally formed in the housing body 402 and accommodates an IR-pass/visible light blocking filter 410. The filter 410 has an IR-pass wavelength range of between about 830 nm and about 880 nm. The image sensor (not shown) and associated lens are positioned behind the filter 410 and oriented such that the field of view of the image sensor looks through the filter 410 and generally across the touch area 202. The rear portion 406 is shaped to surround the image sensor. Three passages 412a to 412c are formed through the housing body 402. Passages 412a and 412b are positioned on opposite sides of the filter 410 and are in general horizontal alignment with the filter 410. Passage 412c is centrally positioned above the filter 410. Each tubular passage receives a light source socket 414 that is configured to receive a respective one of the IR LEDs. The light source socket 414 may be keyed to prevent the light source socket 414 from rotating in the respective passage 412a-c. Mounting flanges 416 are provided on opposite sides of the rear portion 406 to facilitate connection of the housing assembly 400 to the periphery of the touch area 202 via suitable fasteners.

Figure 5:
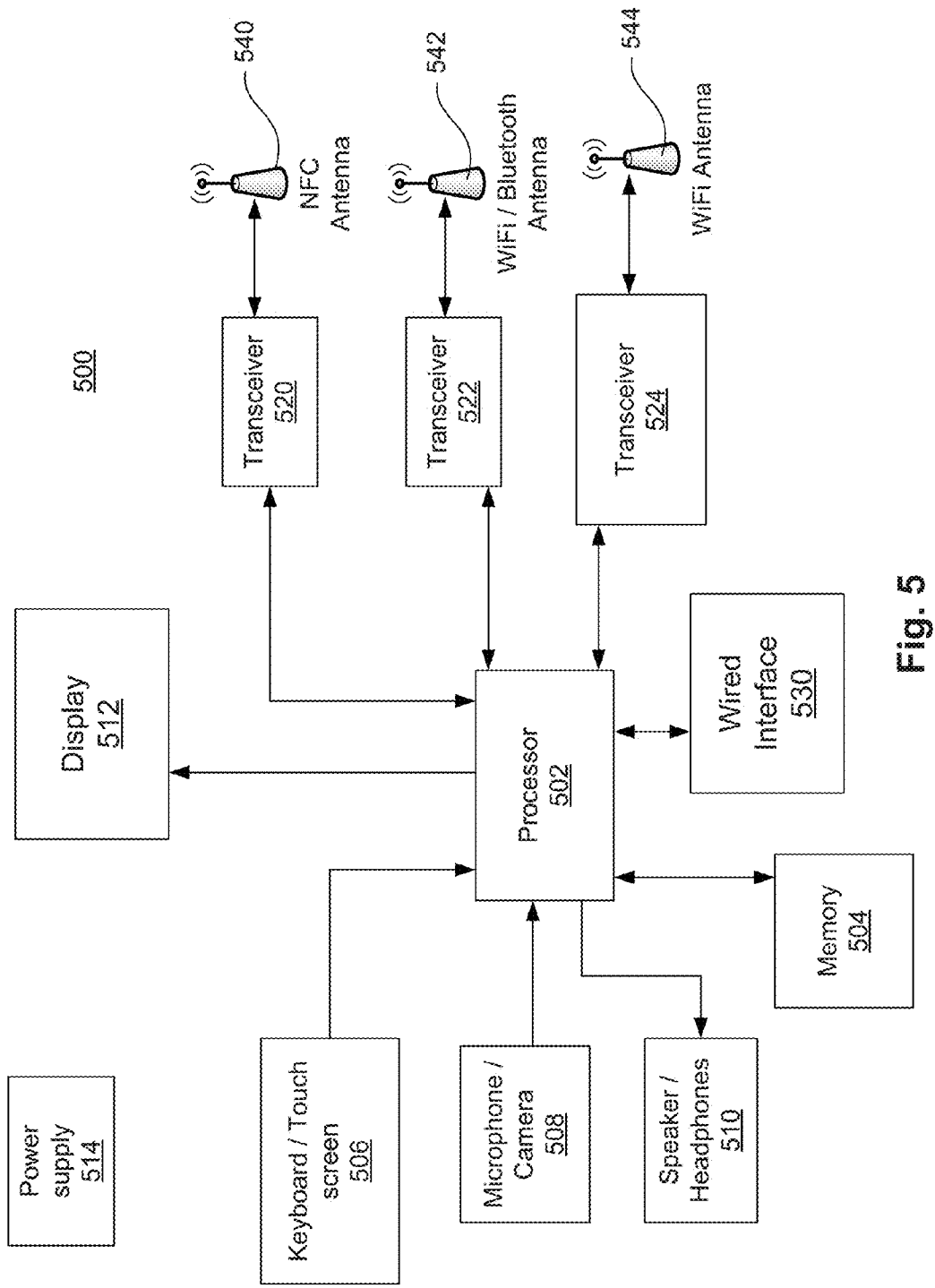
FIG. 5 demonstrates a processing structure of a mobile device.

The components of an example mobile device 500 is further disclosed in FIG. 5 having a processor 502 executing instructions from volatile or non-volatile memory 504 and storing data thereto. The mobile device 500 has a number of human-computer interfaces such as a keypad or touch screen 506, a microphone and/or camera 508, a speaker or headphones 510, and a display 512, or any combinations thereof. The mobile device has a battery 514 supplying power to all the electronic components within the device. The battery 514 may be charged using wired or wireless charging.

The keyboard 506 could be a conventional keyboard found on most laptop computers or a soft-form keyboard constructed of flexible silicone material. The keyboard 506 could be a standard-sized 101-key or 104-key keyboard, a laptop-sized keyboard lacking a number pad, a handheld keyboard, a thumb-sized keyboard or a chorded keyboard known in the art. Alternatively, the mobile device 500 could have only a virtual keyboard displayed on the display 512 and uses a touch screen 506. The touch screen 506 can be any type of touch technology such as analog resistive, capacitive, projected capacitive, ultrasonic, infrared grid, camera-based (across touch surface, at the touch surface, away from the display, etc), in-cell optical, in-cell capacitive, in-cell resistive, electromagnetic, time-of-flight, frustrated total internal reflection (FTIR), diffused surface illumination, surface acoustic wave, bending wave touch, acoustic pulse recognition, force-sensing touch technology, or any other touch technology known in the art. The touch screen 506 could be a single touch or multi-touch screen. Alternatively, the microphone 508 may be used for input into the mobile device 500 using voice recognition.

The display 512 is typically small-size between the range of 1.5 inches to 14 inches to enable portability and has a resolution high enough to ensure readability of the display 512 at in-use distances. The display 512 could be a liquid crystal display (LCD) of any type, plasma, e-Ink®, projected, or any other display technology known in the art. If a touch screen 506 is present in the device, the display 512 is typically sized to be approximately the same size as the touch screen 506. The processor 502 generates a user interface for presentation on the display 512. The user controls the information displayed on the display 512 using either the touch screen or the keyboard 506 in conjunction with the user interface. Alternatively, the mobile device 500 may not have a display 512 and rely on sound through the speakers 510 or other display devices to present information.

The mobile device 500 has a number of network transceivers coupled to antennas for the processor to communicate with other devices. For example, the mobile device 500 may have a near-field communication (NFC) transceiver 520 and antenna 540; a WiFi®/Bluetooth® transceiver 522 and antenna 542; a cellular transceiver 524 and antenna 544 where at least one of the transceivers is a pairing transceiver used to pair devices. The mobile device 500 optionally also has a wired interface 530 such as USB or Ethernet connection.

The servers 120, 122, 124 shown in FIG. 6 of the present embodiment have a similar structure to each other. The servers 120, 122, 124 have a processor 602 executing instructions from volatile or non-volatile memory 604 and storing data thereto. The servers 120, 122, 124 may or may not have a keyboard 306 and/or a display 312. The servers 120, 122, 124 communicate over the Internet 150 using the wired network adapter 624 to exchange information with the paired mobile device 105 and/or the interactive whiteboard 112, conferencing, and sharing of captured content. The servers 120, 122, 124 may also have a wired interface 630 for connecting to backup storage devices or other type of peripheral known in the art. A wired power supply 614 supplies power to all of the electronic components of the servers 120, 122, 124.

Figure 7A:
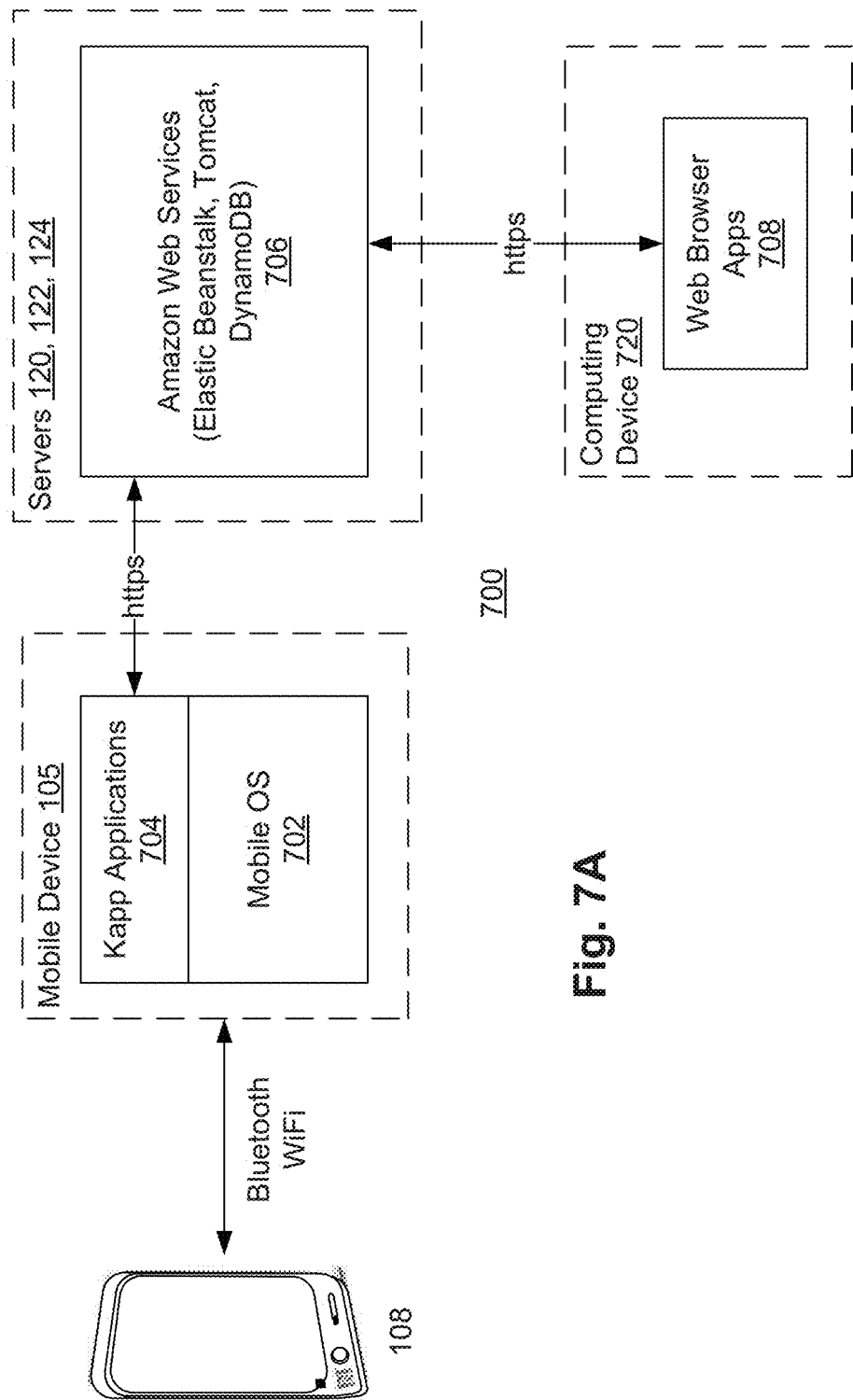

An overview of the system architecture 700 is presented in FIGS. 7A and 7B. The interactive whiteboard 112 is paired with the mobile device 105 to create one or more wireless communications channels between the two devices. The mobile device 105 executes a mobile operating system (OS) 702 which generally manages the operation and hardware of the mobile device 105 and provides services for software applications 704 executing thereon. The software applications 704 communicate with the servers 120, 122, 124 executing a cloud-based execution and storage platform 706, such as for example Amazon Web Services, Elastic Beanstalk, Tomcat, DynamoDB, etc, using a secure hypertext transfer protocol (https). Any content stored on the cloud-based execution and storage platform 706 may be accessed using an HTML5-capable web browser application 708, such as Chrome, Internet Explorer, Firefox, etc., executing on a computer device 720. When the mobile device 105 connects to the interactive whiteboard 112 and the servers 120, 122, 124, a session is generated as further described below. Each session has a unique session identifier.

FIG. 7B shows an example protocol stack 750 used by the devices connected to the session. The base network protocol layer 752 generally corresponds to the underlying communication protocol, such as for example, Bluetooth, WiFi Direct, WiFi, USB, Wireless USB, TCP/IP, UDP/IP, etc. and may vary based by the type of device. The packets layer 754 implement secure, in-order, reliable stream-oriented full-duplex communication when the base networking protocol 752 does not provide this functionality. The packets layer 754 may be optional depending on the underlying base network protocol layer 752. The messages layer 756 in particular handles all routing and communication of messages to the other devices in the session. The low level protocol layer 758 handles redirecting devices to other connections. The mid level protocol layer 760 handles the setup and synchronization of sessions. The High Level Protocol 762 handles messages relating the user generated content as further described herein. These layers are discussed in more detail below.

The protocol upgrade message may also alter acceptable pointer 204 for use with the interactive whiteboard 112. When devices 105 and/or 108 in a session are using the basic protocol, the interactive whiteboard 112 may only be limited to discriminating between pointers 204 and erasers 206. This allows the session to only accept a binary or possibly grayscale page in instances where pressure or pointer width information is known. When devices 105 and/or 108 in a session are using a level 1 protocol, the interactive whiteboard 112 may be able to discriminate between erasers, pens with colours such as black, red, green, and blue, and/or highlighter using the method and system described further below. The interactive whiteboard 112 reports the pointer types, identifiers for the pointer types, and attributes thereof to the dedicated application on the mobile device 105. The inventor contemplates that other colours are possible and may be user selectable or chosen from an online profile. The interactive whiteboard 112 may also be capable of identifying a cursor, such as the user's finger, which may be used to select and/or move graphical objects such as scrollbars, buttons, checkboxes, etc. As previously mentioned, the interactive whiteboard 112 may determine the type of pointer 204 or eraser 206 based on the pointer size, modulated light, shape of pointer, glyph or iconography on the pointer, RF transmission, ultrasonic pulse, etc. However, the example described herein identifies the pointer type based on pointer size.

As the size of the interactive whiteboard 112 increases, it becomes increasingly difficult to reliably determine the pointer type 204 based on the width. For the example described herein, the pointer 204 width at the center of the interactive whiteboard 112 will cover less than 1 pixel on the camera 220 for pointers 204 ranging from 1.5 cm to 2 cm for a finger and 4 mm to 5 mm for a pen. Given that the camera 220 has a point-spread function (PSF), this narrow pointer 202 image acts to reproduce the PSF at this camera location. The PSF may be disentangled from the pointer 202 image using a model-based approach as herein described by taking into account both the pointer and PSF widths. At larger distances, these two parameters become comparable in magnitude and difficult to disentangle.

Figure 8A:
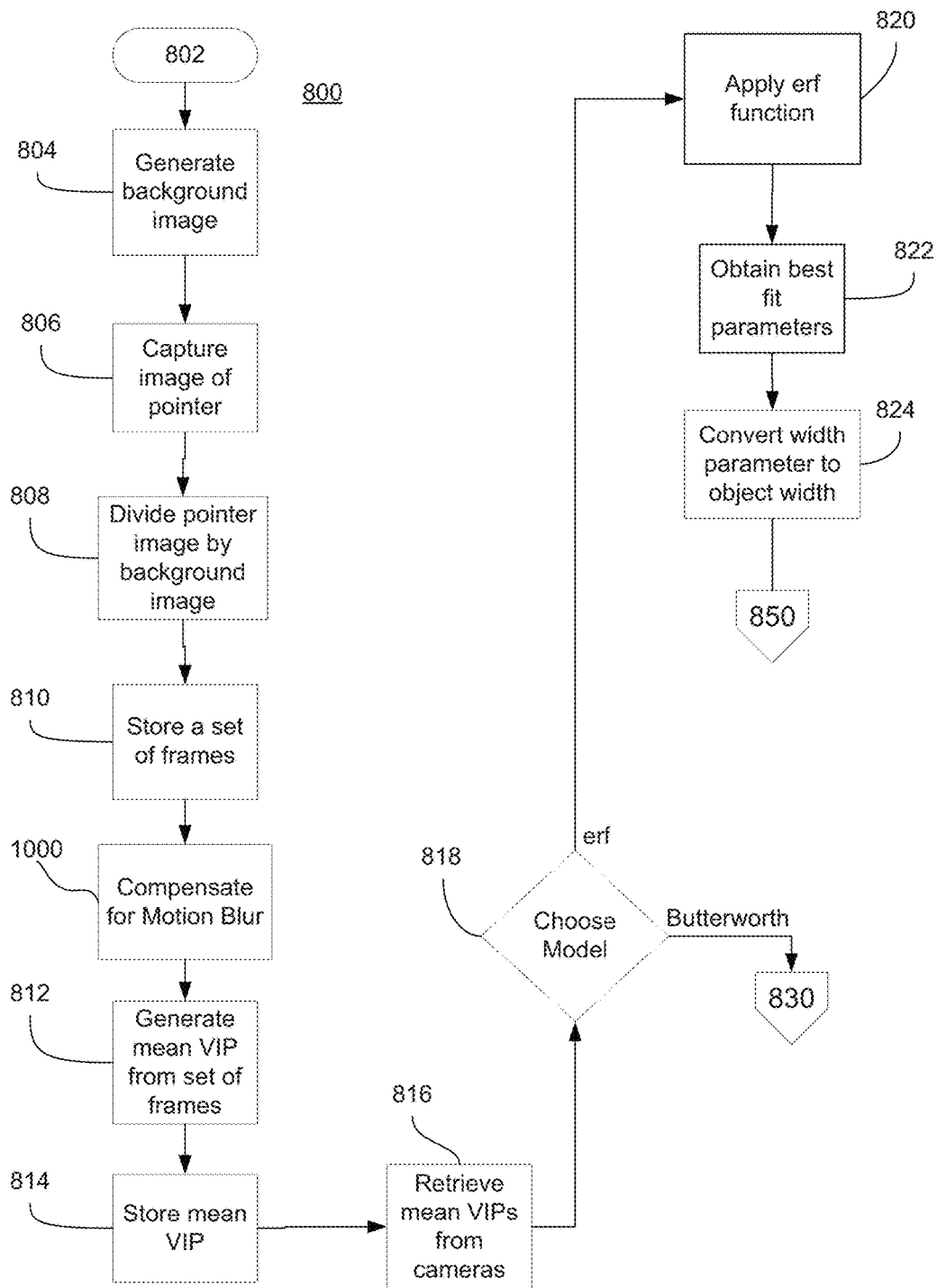
FIGS. 8A and 8B show a flowchart of a method configuring the processing structure to determine a pointer type.

The method 800 is described with reference to FIGS. 8A and 8B where the process starts at step 802. For each wavelength band, a background image using the first 400 to 500 frames of each video was generated when the pointer 204 was not present (step 804). When the pointer 204 is placed on the touch area 202 (step 806), the video frames are divided by the appropriate background image (step 808). Alternatively, the video frames may be differenced by the appropriate background image. A set of frames is then stored (step 810) for determining a vertical intensity profile (VIP). In one example, the intensity profile is a mean vertical intensity profile (VIP) generated by averaging over 10 frames in order to reduce the noise level but may be greater during calibration such as 100 frames. The set of frames is selected to be temporally close to one another in order for appropriate pointer tracking. The mean VIP is then stored (step 814). Therefore, the pointer 204 in the image produces a positive VIP peak above a nearly constant background image. The mean VIP from one or more cameras 220 may be used to determine the width of the pointer 204 (step 816) using either an "erf model" or a "Butterworth model" (step 818). If the erf model is chosen, processing proceeds to step 820, otherwise it proceeds to 830 which continues in FIG. 8B. The pointer 204 has a VIP which may be described as a rectangle function of width of 2·w pixels convoluted with a Gaussian PSF having a width parameter of σ pixels, which may be implemented according to built-in erf functions used in C++ or Matlab (step 820). This equation, also referred to as the "erf model", is presented as $$F = \frac{A}{2} \cdot \left( \text{erf}\left( \frac{x - x_0 + w}{\sqrt{2} \cdot \sigma} \right) - \text{erf}\left( \frac{x - x_0 - w}{\sqrt{2} \cdot \sigma} \right) \right) + ZPT$$

where $x_0$ is the computed position of the VIP peak in the image, A is an arbitrary amplitude and ZPT is a zero-level offset, w is the half-width parameter. This function may be fitted to an observed VIP at a particular distance using a particular camera 220 to obtain a set of best fit parameters (step 822). Such a fit may be computed using nonlinear least-squared method, and for this purpose the Levenberg-Marquardt (LM) method was chosen. This is a matrix-based method the evaluates the derivatives of F with respect to the parameters (A, $x_0$, w, σ, ZPT) permitting the parameter errors to be computed as well as inter-parameter correlations.

For example, the pointer 204 at a distance of 105 cm from the camera 220, the parameters are $A = 0.654 \pm 0.009$ $x_0 = 400.39 \pm 0.02$ pixels $w = 2.36 \pm 0.03$ pixels $\sigma = 0.92 \pm 0.04$ pixels $ZPT = 0.012 \pm 0.002$ with an RMS error of the fit of ±0.0091. The width parameter may be converted into an object width (in cm) (step 824), using the known distance of 105 cm and a camera focal length of 281.25 pixels:

$$2 \cdot 2.36 \cdot \frac{105}{281.25} = 1.76 \pm 0.02 \text{ cm.}$$

Figure 8B:
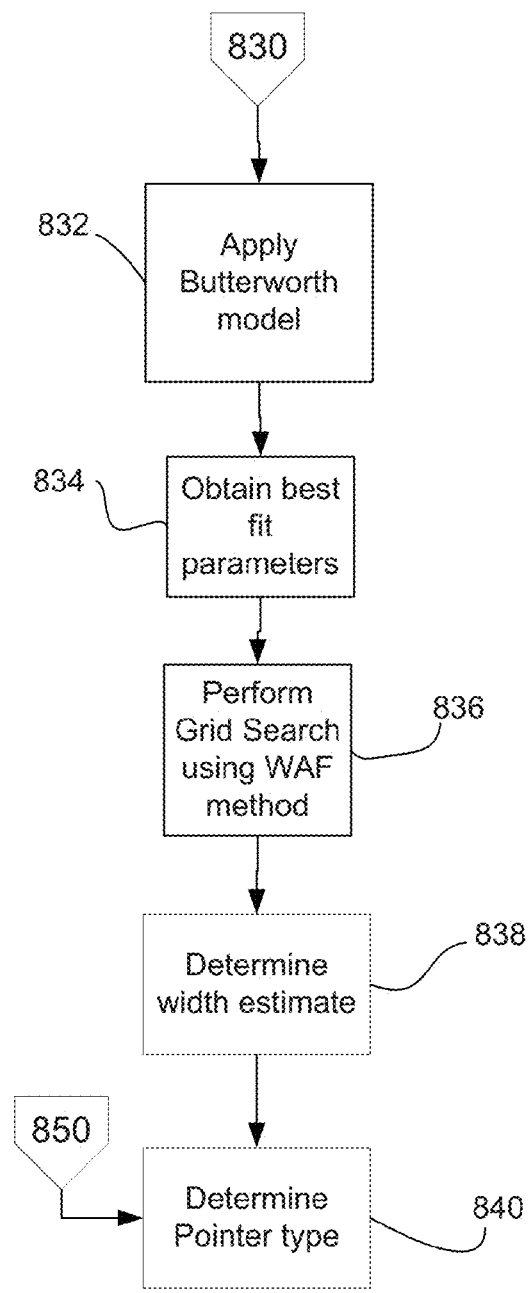

Processing proceeds by way of 850 to FIG. 8B. The introduction of pointer 204 tilt causes a slight systematic increase in width of the pointer 204.

For finger data sets, fixing the PSF width σ to 0.7 pixels improved results because at large distances, the parameter correlations caused the pointer and the PSF widths to be highly correlated and often interchanged values. A method of fixing parameters in the Levenberg-Marquardt method using Lagrange multipliers is described by Morbey, C. L. 1975. *A synthesis of the solutions of spectroscopic and visual binary orbits*. Publ. Astron. Soc. Pacific 87, 689-694, herein incorporated by reference in its entirety.

In yet another model, referred to herein as the "Butterworth model" due to the similarity to the Butterworth filter from signal processing, the pointer object model is:

$$F = A \cdot \frac{1}{1 + \left(\frac{x - x_0}{w}\right)^6} + ZPT$$

where the different parameters have meanings similar to those in the erf model (step 832). This is a tolerable approximation to the erf model. This Butterworth model may again be fitted using the LM method and exhibits no strong parameter correlations at the expense of reduced object separation with distance (step 834). In this case, the pointer 204 and PSF widths are deliberately kept combined with the effect that there is more overlap between pointers 204 of different widths at a given distance. The PSF width stays at a similar width across the field of view, while the pointer width changes arbitrarily. Therefore, for different pointer 204 types, the width parameter is different for each type but cannot be interpreted as a real pointer 204 width. The Butterworth model has the computational advantage that special function evaluations are not required making it suitable for real-time implementation. Also, since there are no strong parameter correlations, a simpler grid search optimization algorithm can be used such as grid least-squares (GRIDLS) algorithm of Bevington and Robinson, 2003. *Data reduction and error analysis for the physical sciences*, 3$^{rd}$ Edition. McGraw-Hill, herein incorporated by reference in its entirety.

The grid search algorithm over a grid of (x_, w) successively searches along each axis in parameter space for the maximum of:

$$\Xi(x_0, w) = -\sum_{i=1}^{N} |y_i - F(x_i; x_0, w)|^p$$

where $y_i$ is the value of the VIP at pixel I, and F ($x_i$; $x_0$, w) is the corresponding value of the Butterworth model function (step 836). The parameter p is fixed at either 1 or 2 to give respectively a $L_1$ solution or a least-squares solution. This algorithm is known as the wide-band ambiguity function (WAF) method. The width found using this technique deliberately combines the object width with the width of the camera's PSF as long as the widths for pen and fingers found using the WAF method are significantly different, they need not measure the true width of the object. This algorithm is also simple enough for real-time implementation. Using this technique the Green channel with an infrared frequency range of around 850 nm gave the best results.

In a different example at a distance of 103.2 cm with a pointer having an approximate width of 1.5-2 cm, the fit parameters are:

$A = 0.682$ $x_0 = 193.8$ pixels $w = 2.33$ pixels $ZPT = 0.0058$ with an RMS error of the fit being ±0.0173.

An independent width estimate may be obtained by integrating the function that best fits a given set of VIP data for a particular interactive whiteboard 112. Performing this integral removes the effect of the PSF, assuming that it is the only parameter broadening the VIP from an ideal rectangular VIP. This integral is referred to as the "equivalent width" (EW), and it is related directly to the width of the pointer 204 (step 824). This may be illustrated by integrating the erf model for the case of A=1, $x_0$=0, ZPT=0:

$$EW = \int_{-\infty}^{\infty} \frac{1}{2} \cdot \left( \text{erf}\left(\frac{x - x_0 + w}{\sqrt{2} \cdot \sigma}\right) - \text{erf}\left(\frac{x - x_0 - w}{\sqrt{2} \cdot \sigma}\right) \right) dx = 2 \cdot w$$

The EW for the Butterworth model (step 838) is $$EW = \frac{2}{3} \cdot \pi \cdot w.$$

Fitting either of these models to a VIP is a nonlinear least-squares problem, and an appropriate algorithm must be used. A rigorously correct approach is to use an algorithm such as Levenberg-Marquardt (Press et al, 2007, section 15.5.2), as it encompasses the full nonlinearity of the problem. However, for a hardware (e.g., fixed-point) implementation, a simpler algorithm must be used. At present, the wide-band ambiguity function (WAF) method adapted from Radar signal processing can be used for this purpose as previously described. A limitation of this approach is that the WAF must be evaluated at a fixed grid of width values which, if not carefully chosen, can introduce a bias into the estimated object width. Nevertheless, the WAF method may be efficiently executed on the processing structure 300 of the capture board or alternatively on the processing structure 500 of the mobile device.

Based on either the Butterworth model or the erf model, the pointer type is determined at step 840 using a width threshold that may be around 1 cm for differentiating a pointer from a finger according to the examples described herein. Nevertheless, different thresholds may be used depending on the characteristics of the types of pointers used.

Figure 9A:
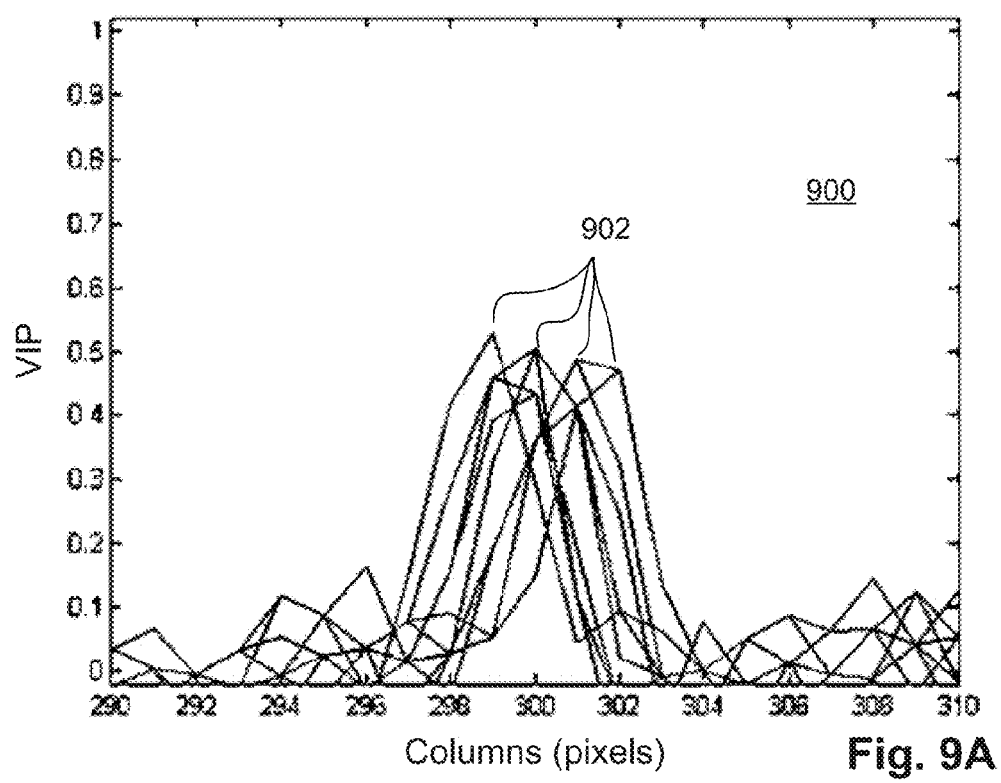
FIGS. 9A and 9B demonstrate an plot of motion blur in an interactive system.
Figure 9B:
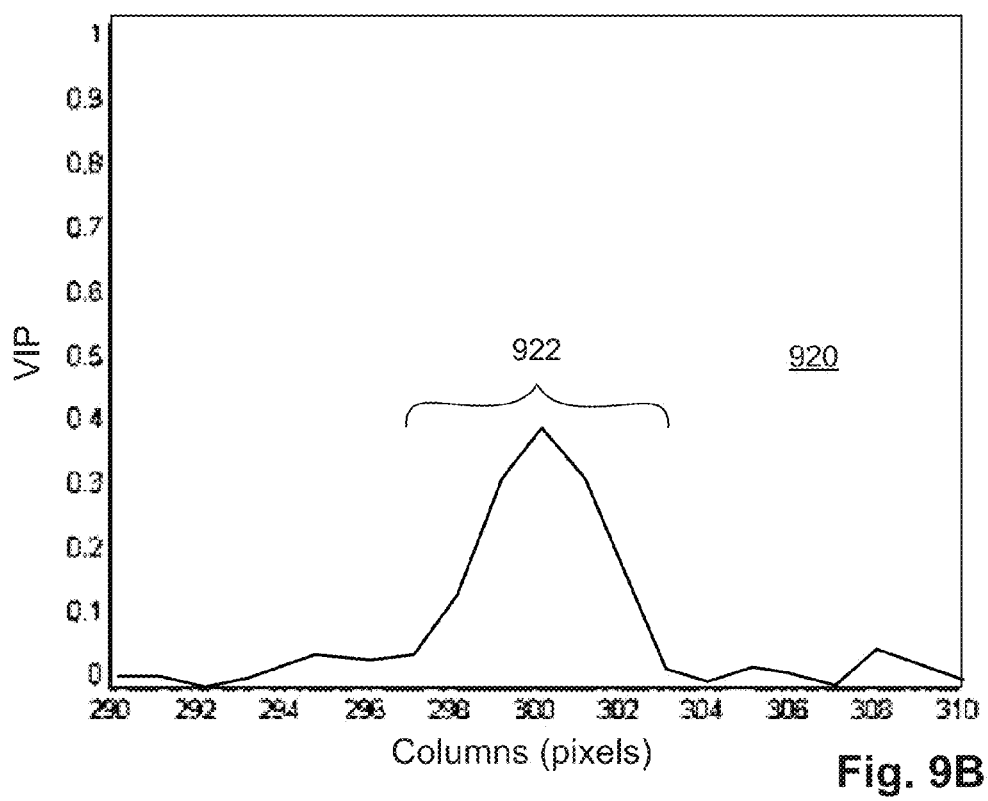

When discriminating between pointers, especially pointers with similar sizes at a distance, motion blur causes a significant amount of overlap between objects of supposedly different sizes. Motion blur is described with reference to FIGS. 9A and 9B where 10 VIPs are obtained from successive video frames. The object in this example is a 4 mm pen tip moving across the surface of the touch area 202. These 10 VIPs 900 shown in FIG. 9A with peaks (some of which are labeled 902 for clarity) are averaged together to form the mean VIP 920 shown in FIG. 9B, which becomes artificially widened 922 due to the motion blur of the pointer over the 10 video frames. The result is an error caused by the motion blur in determining the size and position of the pointer.

Object recognition of the pointer involves fitting a model as previously mentioned to the mean VIP, using a nonlinear least-squares procedure resulting in a width estimate for the pointer. This width can be corrected for the distance of the pointer from the camera, producing a width in cm. A by-product of the fit is an estimate of the width of the camera's point-spread function (PSF).

The correction of the motion blur 1000 occurs prior to the generation of the mean VIP from the set of frames. One approach to reduce the effect of the motion blur involves estimating the peak locations of each of the frames in the set, in this example 10 VIP peaks. The spread in these positions then characterizes the motion blur. For the present purposes, the standard deviation of these positions is used, and is denoted by $\sigma_{motion}$. In the fitting procedure, the motion blur means that an estimated PSF width will be larger due to the motion blur. In other words, what is being computed is in fact $$\sigma' = \sqrt{\sigma_{PSF}^2 + \sigma_{motion}^2}$$

Therefore, knowing $\sigma_{motion}$ allows $\sigma_{PSF}$ to be determined once the fit has been computed. Since there is usually a correlation between the pointer and PSF width, searching for a larger PSF width $\sigma'$ results in a more accurate pointer width.

For example, Table 1 presents example data obtained for a pointer with a tip of 0.4 cm without motion blur correction. In comparison, Table 2 presents results of this peak estimation approach. In this case, the computed PSF width a was identified using the camera PSF width. Both the pointer and PSF widths are large than expected.

TABLE 1

| Frame | Distance from Camera 0 (cm) | Object Width (pixels) | Object Width (cm) | Computed σ (pixels) |
|---|---|---|---|---|
| 214 | 84.98 | 0.81 | 0.49 | 1.23 |
| 235 | 76.22 | 1.87 | 1.02 | 0.91 |
| 241 | 74.49 | 1.16 | 0.62 | 1.39 |

TABLE 2

| Frame | Distance from Camera 0 (cm) | Object Width (pixels) | Object Width (cm) | Motion blur SD (pixels) | Computed σ (pixels) | Corrected PSF width (pixels) |
|---|---|---|---|---|---|---|
| 214 | 84.98 | 0.59 | 0.36 | 0.95 | 1.28 | 0.86 |
| 235 | 76.22 | 0.73 | 0.40 | 0.97 | 1.47 | 1.11 |
| 241 | 74.49 | 0.86 | 0.46 | 1.29 | 1.47 | 0.70 |

Figure 9C:
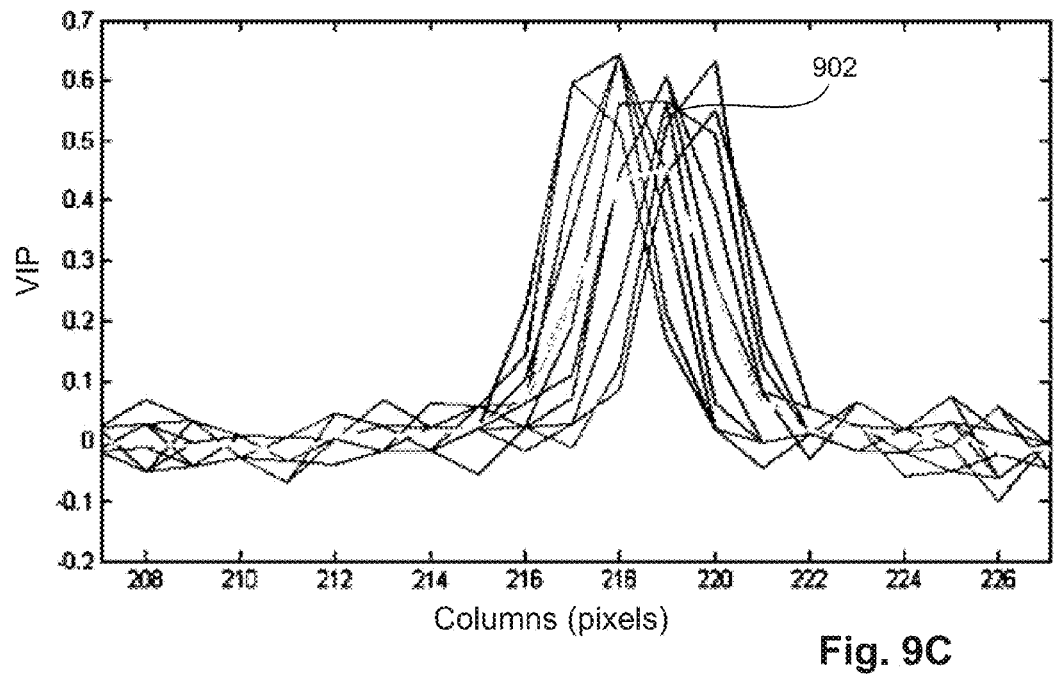
FIGS. 9C and 9D demonstrate a plot for correcting of motion blur in an interactive system.
Figure 9D:
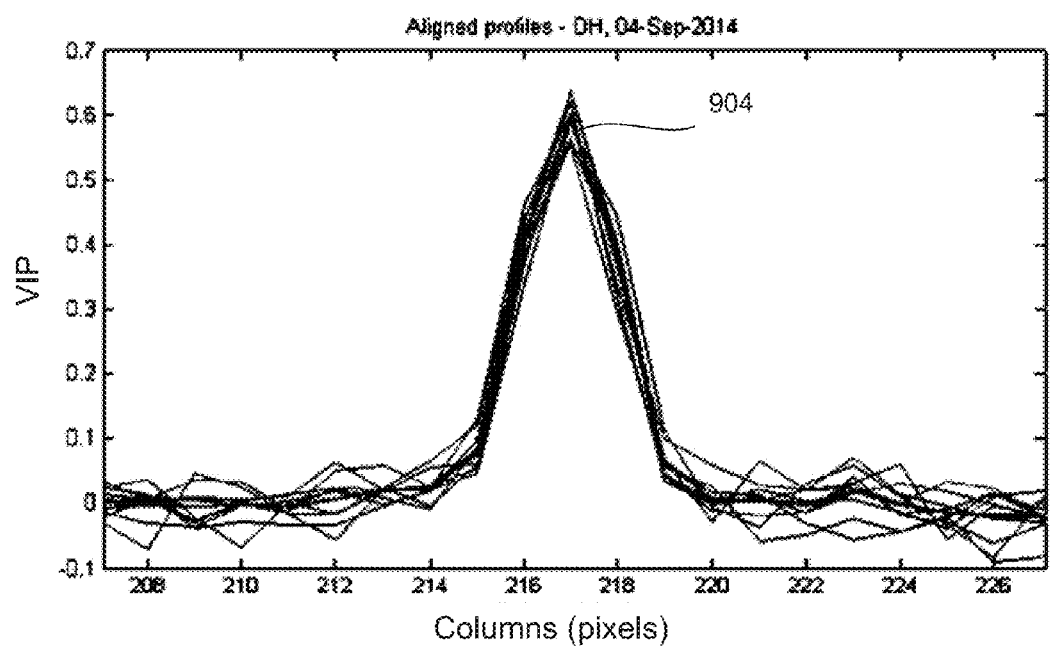

Another approach referred to herein as profile alignment makes use of the linear trend of VIP peak positions. As shown in FIG. 9C, the unaligned peaks 902 result in a motion blur. If these peak positions are estimated, even to the nearest pixel, then a linear fit to the peak positions characterizes the motion blur. The motion blur may then be corrected by shifting the individual VIPs 904 according to the position computed by the linear fit as shown in FIG. 9D. This shifting is performed using spline interpolation in order to compensate for fractional pixels.

Using the same example as above, Table 3 presents the corrected data using this approach. In this case, the motion blur is either zero or relatively small with inaccuracies resulting from the peak of a VIP not falling on a single pixel. The pointer widths are consistent with those found using the peak estimation approach and the PSF widths are in the expected range.

TABLE 3

| Frame | Distance from Camera 0 (cm) | Object Width (pixels) | Object Width (cm) | Motion blur SD (pixels) | Computed σ (pixels) | Corrected PSF width (pixels) |
|---|---|---|---|---|---|---|
| 214 | 84.98 | 0.59 | 0.36 | 0.00 | 1.28 | 0.97 |
| 235 | 76.22 | 0.83 | 0.45 | 0.52 | 1.47 | 0.75 |
| 241 | 74.49 | 0.91 | 0.48 | 0.00 | 1.47 | 0.98 |

This more accurate and computationally efficient method of pointer identification permits the user to draw on the interactive whiteboard 112 with pointer 204 (e.g. pen) that is recognized as different colours. The basic protocol may append an 8-bit contact number to the ink-related messages. When multiple pointers 204 are used, each pointer 204 may be assigned a pointer identifier that may be included in the path-related messages. The method also permits identification of a finger as a pointer for control and editing of the content objects. When a pointer 204 stroke is detected and recorded by the touch system as a path-related (or shape-related) message, such as a line path, shape path, or a curve path, within a STROKE_BEGIN/STROKE_END tags. The path-related message comprises a relative time stamp of the beginning of the stroke, stroke width, pointer identifier, and (x,y) coordinates. For specific types of shapes, such as for example a circle, the shape related message (such as, for example, LINE_PATH, CURVE_PATH, CIRCLE_SHAPE, ELLIPSE_SHAPE, etc.) may be abbreviated as the (x,y) coordinates of the center of the circle and the radius. Other shapes may be represented using conic mathematical descriptions, cubic Bezier splines (or other type of spline), integrals (e.g. for filling in shapes), line segments, polygons, ellipses, etc. Alternatively the shapes may be represented by xml descriptions of scalable vector graphics (SVG). This path-related message is transmitted to the mobile device 105 which scales the stroke to the display size and displays the stroke in the specified location.

Although the examples described herein use an erf model or a Butterworth model, the inventor contemplates that the erf model may be used when the processing structure 300 is sufficient or may revert to the Butterworth model when the processing structure 300 is insufficient. Alternatively, the erf model may be used during a calibration mode and then the Butterworth model may be used during a conventional operation mode. In yet another alternative, the erf model may be executed on a subset of the images whereas the Butterworth model may be executed on a majority of the images. In this alternative, the erf model periodically confirms the accuracy of the Butterworth model. The erf model may be executed on the processing structure 500 of the mobile device 105 whereas the Butterworth model may be executed on the processing structure 300 of the interactive whiteboard 112 or capture board 108.

Although the examples described herein use a vertical intensity profile, the inventor contemplates, depending on the camera orientation, a horizontal intensity profile may be used. Further, should the camera be aligned at an angle to the touch area 202, the intensity profile may be at an arbitrary angle based on the misalignment of the camera.

Although a Bluetooth connection is described herein, the inventor contemplates that other communication systems and standards may be used such as for example, IPv4/IPv6, Wi-Fi Direct, USB (in particular, HID), Apple's iAP, RS-232 serial, etc. In those systems, another uniquely identifiable address may be used to generate a board ID using a similar manner as described herein.

Although the embodiments described herein refer to a pen, the inventor contemplates that the pointer may be any type of pointing device such as a dry erase marker, ballpoint pen, ruler, pencil, finger, thumb, or any other generally elongate member. Preferably, these pen-type devices have one or more ends configured of a material as to not damage the display 318 or touch area 202 when coming into contact therewith under in-use forces.

Although the embodiments described herein describe specific camera parameters and specific fields of view, the inventor contemplates that the content herein may equally apply to cameras and board sizes having different parameters.

The emitters and cameras may be narrower or wider, narrower angle or wider angle, various wavelengths, various powers, coherent or not, etc. As another example, different types of multiplexing may be used to allow light from multiple emitters to be received by each camera. In another alternative, the FPGA 302 may modulate the light emitted by the emitters to enable multiple emitters to be active at once.

The touch screen 306 can be any type of camera-based or image sensor-based touch technology such as infrared grid, camera-based (across touch surface, at the touch surface, away from the display, etc), time-of-flight, frustrated total internal reflection (FTIR) with cameras with a field of view across the FTIR surface, and/or diffused surface illumination. Alternate examples may use a lit bezel having a plurality of IR LEDs and a diffuser surrounding at least a portion of the touch surface. The touch screen 306 could be a single touch, a multi-touch screen, or a multi-user, multi-touch screen.

Although the mobile device 200 is described as a smartphone 102, tablet 104, or laptop 106, in alternative embodiments, the mobile device 105 may be built into a conventional pen, a card-like device similar to an RFID card, a camera, or other portable device.

Although the servers 120, 122, 124 are described herein as discrete servers, other combinations may be possible. For example, the three servers may be incorporated into a single server, or there may be a plurality of each type of server in order to balance the server load.

Although the examples described herein are in reference to interactive whiteboard 112, the inventor contemplates that the features and concepts may apply equally well to other collaborative devices 107 such as the capture board 108, the interactive flat screen display 110, the interactive table 114, or other type of interactive device. Each type of collaborative device 107 may have the same protocol level or different protocol levels.

The above-described embodiments are intended to be examples of the present invention and alterations and modifications may be effected thereto, by those of skill in the art, without departing from the scope of the invention, which is defined solely by the claims appended hereto.

What is claimed is:

1. An interactive system comprising:
   a processing structure;
   an interactive surface;
   at least two cameras having fields of view observing the interactive surface and in communication with the processing structure; and
   a computer-readable medium comprising instructions to configure the processing structure to:
      receive a plurality of video frames from the cameras;
      recognize a pointer within a portion of the video frames by dividing each of the portion of video frames by a background image to recognize the pointer;
      compensate for motion blur of an image of the pointer within the plurality of video frames to form compensated frames;
      process the compensated frames to generate an intensity profile; and
      determine a pointer type from the compensated frames and the intensity profile.

2. The interactive device according to claim 1 further comprising instructions to configure the processing structure to generate the background image from a number of images without the pointer being present.

3. The interactive device according to claim 1 wherein the compensation for motion blur occurs over a window of frames.

4. The interactive device according to claim 1 further comprising instructions to configure the processing structure to measure a width parameter of the pointer to determine the pointer type.

5. The interactive device according to claim 4 wherein the width parameter comprises a point-spread function (PSF) width and a real pointer width.

6. The interactive device according to claim 5 further comprising instructions to configure the processing structure to disentangle the point-spread function width and the real pointer width.

7. The interactive device according to claim 6 further comprising instructions to configure the processing structure to determine best fit parameters for a model selected from at least one of an erf model, a Butterworth model, and/or a combination thereof, wherein the erf model is defined by $$F = \frac{A}{2} \cdot \left( \text{erf}\left( \frac{x - x_0 + w}{\sqrt{2} \cdot \sigma} \right) - \text{erf}\left( \frac{x - x_0 - w}{\sqrt{2} \cdot \sigma} \right) \right) + ZPT$$

and the Butterworth model is defined by $$F = A \cdot \frac{1}{1 + \left( \frac{x - x_0}{w} \right)^6} + ZPT$$

where $x_0$ is the computed position of the VIP peak in the image, A is an arbitrary amplitude, $\sigma$ is a PST width, and ZPT is a zero-level offset, and w is the half-width parameter of the pointer.

8. The interactive device according to claim 7 further comprising instructions to configure the processing structure to determine the best fit parameters by a nonlinear least-squares method.

9. The interactive device according to claim 8 wherein the nonlinear least-squared method comprises a wide-band ambiguity function (WAF).

10. The interactive device according to claim 9 further comprising instructions to configure the processing structure to determine an equivalent width of the pointer by integrating the Butterworth model.

11. The interactive device according to claim 7 further comprising instructions to configure the processing structure to determine an equivalent width of the pointer by integrating the erf model.

12. The interactive device according to claim 6 wherein the PSF width is fixed to about 0.7 pixels.

13. The interactive device according to claim 1 further comprising instructions to configure the processing structure to estimate a peak location for each of the video frames and calculate a standard deviation.

14. The interactive device according to claim 1 further comprising instructions to configure the processing structure to shift the peak location for each of the video frames.

15. The interactive device according to claim 1 further comprising instructions to configure the processing structure to assign a pointer identifier to the pointer.

16. The interactive device according to claim 15 further comprising instructions to configure the processing structure to associate at least one digital ink attribute to the pointer identifier.

17. The interactive device according to claim 1 further comprising an infrared pass filter covering the field of view of the cameras.

18. The interactive device according to claim 17 wherein the infrared pass filter has an infrared range between about 830 nm to about 880 nm.

19. The interactive device according to claim 18 wherein the LEDs emit light at about 850 nm.

20. The interactive device according to claim 1 wherein the interactive device comprises at least one of a capture board, an interactive whiteboard, an interactive flat screen display, or an interactive table.

21. A computer-implemented method comprising:
    receiving, by a processing structure, a plurality of video frames from a plurality of cameras in communication with the processing structure;
    recognizing, by the processing structure, a pointer within a portion of the video frames by dividing each of the portion of video frames by a background image to recognize the pointer;
    compensating, by the processing structure, for motion blur of an image of the pointer within the video frames to form compensated frames;
    processing, by the processing structure, the compensated frames to generate an intensity profile; and
    determining, by the processor, a pointer type from the compensated frames.

* * * * *